United States Patent [19]
McRae

[11] Patent Number: 5,859,596
[45] Date of Patent: Jan. 12, 1999

[54] SWITCHYARD EQUIPMENT MONITORING SYSTEM AND COMMUNICATIONS NETWORK THEREFOR

[75] Inventor: David J. McRae, Langhorne, Pa.

[73] Assignee: CSI Technology, Inc., Wilmington, Del.

[21] Appl. No.: 705,395

[22] Filed: Aug. 30, 1996

[51] Int. Cl.[6] .................................................. G06F 15/20
[52] U.S. Cl. ............................ 340/870.02; 340/310.01; 340/638; 961/64; 324/424; 324/537
[58] Field of Search ................... 340/870.01, 870.02, 340/638, 310.01; 324/424, 537; 364/483, 492; 361/62, 64, 66

[56] References Cited

U.S. PATENT DOCUMENTS

| | | | |
|---|---|---|---|
| 5,179,376 | 1/1993 | Pomatto | 340/810.02 |
| 5,270,658 | 12/1993 | Epstein | 324/424 |
| 5,301,122 | 4/1994 | Halpern | 364/483 |
| 5,384,678 | 1/1995 | Ebersohl et al. | 361/62 |
| 5,490,086 | 2/1996 | Leone et al. | 364/492 |
| 5,491,463 | 2/1996 | Sargeant et al. | 340/310.01 |
| 5,502,435 | 3/1996 | Ralston | 340/632 |
| 5,554,968 | 9/1996 | Lee | 340/310.01 |
| 5,694,108 | 12/1997 | Shuey | 340/310.01 |

OTHER PUBLICATIONS

Technical data manual for Intellon CENode PL, CEBus® Power Line Network Interface, Version 1.0, Intellon Corp., Ocala, Florida, Feb. 15, 1995, 28 pages.

Technical data manual for Intellon CELinx pl, CEBus® Spread Spectrum Power Line Transceiver IC, Preliminary Information Rev. 0.4, Oct. 1, 1993, Intellon Corp., Ocala, Florida, Oct. 1, 1993, 15 pages plus rear cover.

*Primary Examiner*—Michael Horabik
*Assistant Examiner*—Albert K. Wong
*Attorney, Agent, or Firm*—Luedeka, Neely & Graham, P.C.

[57] ABSTRACT

A plurality of monitoring devices are connected to respective pieces of switchyard equipment and associated with a common communications network. A remote host computer is connected to the network to bidirectionally communicate with each monitoring device. The communications network is the existing power line used for delivering power and control signals to the switchyard equipment. Each monitoring device includes testing and/or monitoring circuitry for testing and/or monitoring one or more conditions of the piece of switchyard equipment and generating condition data therefrom, a storage device for storing the generated data, and a transmitter adapted to transmit the data to the remote location via the power line. The remote host computer receives the data transmitted to the remote location and stores the received data therein in a database format. The monitoring device can request previously sent data from the remote host computer. The monitoring includes an RS-232 port for accepting a local computer which conducts tests of the switchyard equipment, analyzes the results, compares the results with previous tests, and reprograms alarm parameters and baseline values associated with the switchyard equipment.

6 Claims, 16 Drawing Sheets

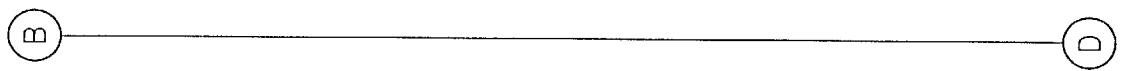
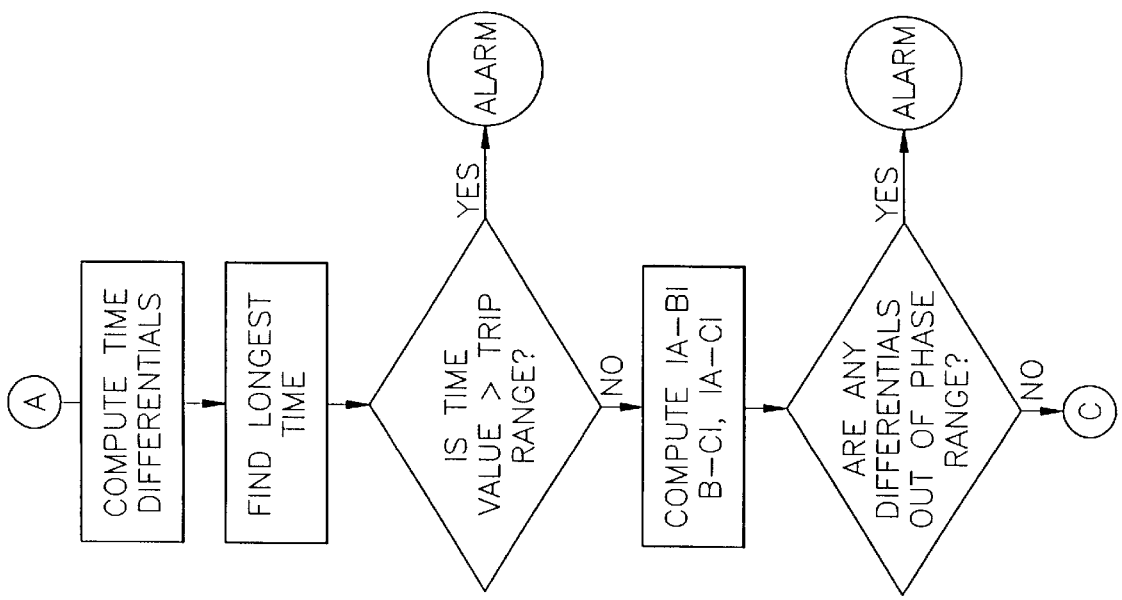
Fig. 5B

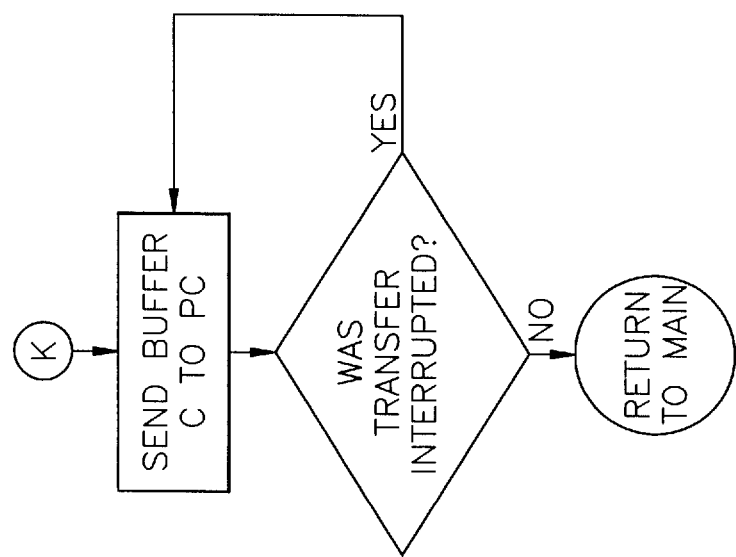

SWITCHYARD EQUIPMENT MONITORING SYSTEM AND COMMUNICATIONS NETWORK THEREFOR

FIELD OF THE INVENTION

The present invention relates generally to a monitoring and testing system for switchyard equipment and a communications network for transmitting operation and test results related to the switchyard equipment throughout a communications network.

BACKGROUND OF THE INVENTION

Electrical power substations or power distribution stations include switchyard equipment or gear, such as circuit breakers, transformers, capacitor banks, and the like which help deliver electrical power. The switchyard equipment must be regularly tested and maintained to minimize the likelihood of a failure during normal operation. Preventive maintenance and replacement schedules are typically established for such equipment, and periodic testing may be performed to detect potential problems. Examples of monitoring systems for switchyard equipment are described in U.S. Pat. No. 5,270,658 (Epstein), U.S. Pat. No. 5,384,678 (Ebersohl et al.) and U.S. Pat. No. 5,179,376 (Pomatto)

Current systems for monitoring switchyard equipment are inefficient, especially because the apparatus used to collect and process data from the equipment are not fully integrated into a single communications network. Also, in current systems, data flows from monitoring/testing devices connected to the switchyard equipment to a central location. Previously collected data stored in the central location cannot be returned to the local equipment site if a maintenance technician needs to review such data at the site. Modems, telephone lines or wireless communications means must be used to communicate the data, thereby necessitating the maintenance of a separate communications network.

Current systems for monitoring switchyard equipment are not capable of performing comprehensive tests of certain switchyard equipment, such as circuit breakers, without using auxiliary test equipment. For example, current monitoring systems do not have a built-in excitation voltage generator for use in testing a plural phase circuit breaker to obtain breaker response time. Current systems are also not capable of retrieving previous test data for on-site analysis of current and previous test data.

Accordingly, there is still a need for a switchyard equipment monitoring system which does not require maintenance of a separate communications network between the equipment and a remote data collection location, which can bidirectionally communicate data between monitoring devices connected to the equipment and the remote data collection location, which collects and organizes the data in a versatile database format, and which allows the data to be manipulated at the equipment, as well as at the remote data collection location, and which allows comprehensive tests to be performed on the equipment without the use of auxiliary test equipment. The present invention fills these needs.

SUMMARY OF THE INVENTION

The present invention provides a switchyard equipment monitoring system. The switchyard equipment receives power and control signals from a remote location via a power line. The system comprises a plurality of monitoring devices, a communications node at the remote location, and a remote host computer connected to the communications node. Each monitoring device is connected to a piece of switchyard equipment. Each monitoring device includes testing and/or monitoring circuitry for testing and/or monitoring one or more conditions of the piece of switchyard equipment and generating condition data therefrom, a storage device for storing the generated data, and a transmitter adapted to transmit the data to the remote location via the power line. The communications node is connected to the power line. The remote host computer receives the data transmitted to the remote location and stores the received data therein.

Another embodiment of the invention provides a monitoring device for switchyard equipment, wherein the switchyard equipment receives power and control signals from a remote location via a power line. The monitoring device comprises testing and/or monitoring circuitry for testing and/or monitoring one or more conditions of the switchyard equipment and generating condition data therefrom, a storage device for storing the data, and a transmitter adapted to transmit the data to a remotely located computer via the power line. The monitoring device can test a plural phase circuit breaker to obtain breaker response time. To perform this function, the monitoring device includes an excitation voltage generator and output adapted for connection to line and load sides of the plural breaker phases, and a circuit adapted to receive test trip event and test close event data, including breaker mechanism movement data, upon application of the excitation voltage.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Certain terminology is used herein for convenience only and is not be taken as a limitation on the present invention.

SYSTEM OVERVIEW

Figure 1:
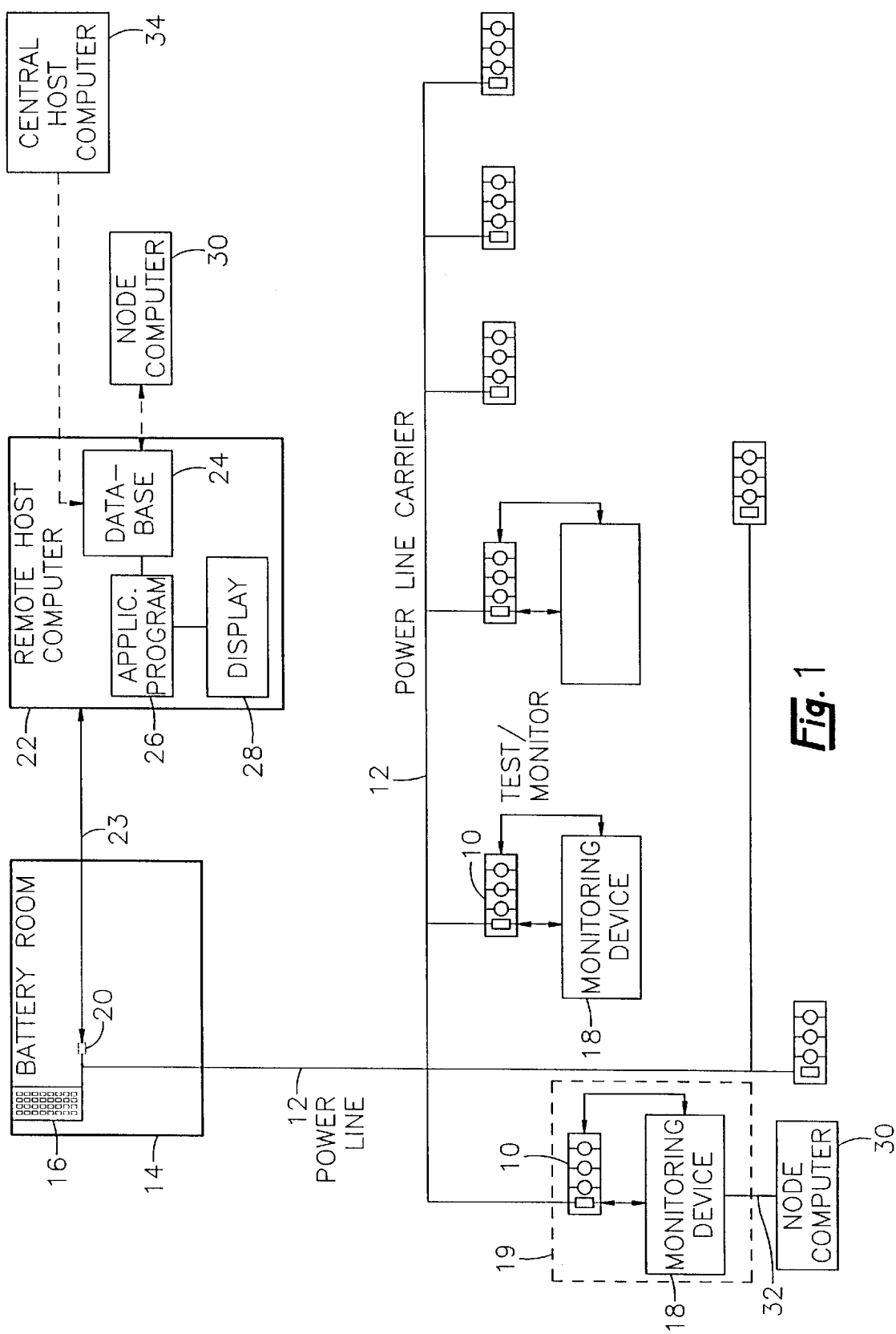
FIG. 1 is a block diagram schematic of a preferred embodiment of the present invention shown in a system environment.

FIG. 1 is an overview of the system environment for the present invention. The present invention is used for collecting and processing operating condition information and data from a plurality of pieces of switchyard equipment or gear. The operating information is collected, stored, and analyzed to provide maintenance personnel with an operating history of the switchyard equipment such that preventive maintenance activities can be more efficiently scheduled, thereby resulting in reduced maintenance cost, increased availability, and extension of equipment service life. The switchyard equipment may be associated with a power distribution switchyard or an electric substation. Switchyard equipment includes circuit breakers, transformers, and the like. The circuit breakers are typically high-voltage, high-power gas or oil type breakers. The invention is described in the context of a circuit breaker monitoring system, although the scope of the invention includes other types of switchyard equipment, including transformers, transmission and distribution circuits, capacitor banks and other power equipment.

Referring to FIG. 1, there is shown a plurality of three-phase circuit breakers 10, each connected to branches at an end of a power line 12. The other end of the power line 12 is connected to a battery room 14 having a bank of batteries 16 and control equipment (not shown). The battery room 14 outputs control voltage signals, typically at 125 or 250 VDC, which are carried by the power line 12 to the respective circuit breakers 10 for controlling the operation of the circuit breakers 10. The power line 12 is also referred to as a local DC power bus. The bank of batteries 16 are constantly trickle-charged by AC power. If AC power is disrupted, the batteries 16 allow the circuit breakers 10 to be controlled for a sufficient period of time before AC power is restored and the batteries 16 can be recharged. The power line 12 is also used to communicate simple control status information from the circuit breakers 10 back to the control equipment in the battery room 14. Each switchyard location includes a plurality of the circuit breakers 10 and a battery room 14. Thus, although the battery room 14 is "remote" from the actual circuit breakers 10, it is in the same site or location as the circuit breakers 10. The above-described elements and system arrangement are conventional. The present invention interfaces with the above-described elements and system arrangement in a novel manner.

Figure 6:
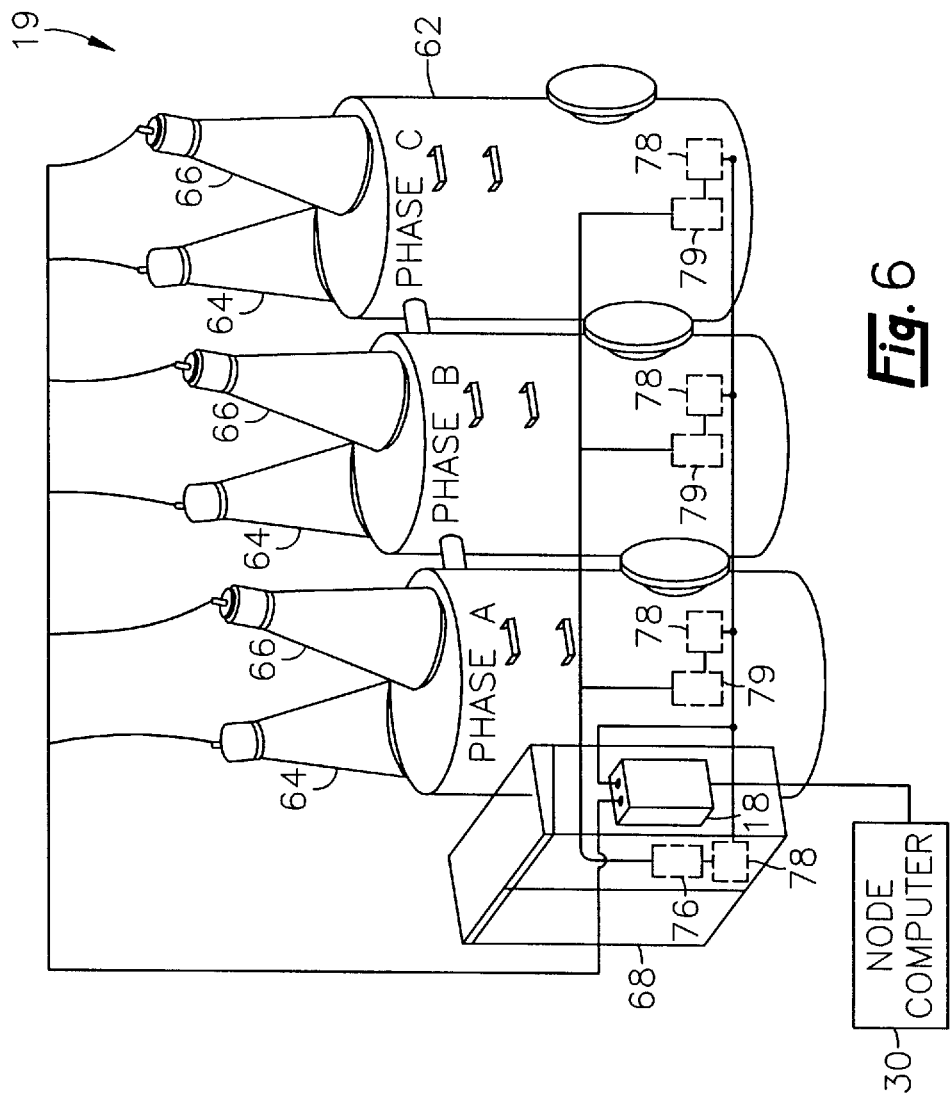
FIG. 6 is a schematic diagram of a circuit breaker configuration of FIG. 1.

There are five major components to the present invention, as follows:

(1) A monitoring device 18 physically located at, and physically connected to, each circuit breaker 10. FIG. 6 illustrates a typical breaker configuration 19. The monitoring device 18 is primarily a transmitter unit, but includes additional functions. The monitoring device 18 interfaces with various sensors, provides data acquisition and limited data processing regarding breaker conditions, and provides communications with other components. Some types of data collected by the monitoring device 18 include the following: time of fault initiation, if a fault occurs; current on each phase when the circuit breaker is operated; time of trip/close coil energization; time of arc extinction; ambient temperature in mechanism cabinet; accumulator air pressure; and gas pressure on compressor.

An important feature of the invention is that each monitoring device 18 is adapted to bidirectionally communicate with the other components via a power line carrier over the existing power line 12. The monitoring device 18 itself is powered by the DC voltage on the power line 12. Another important feature of the invention is that the monitoring device 18 is adapted to conduct comprehensive tests of switchyard equipment without the use of auxiliary test equipment, as required by the prior art. For example, the monitoring device 18 includes a built-in excitation voltage generator for use in testing a plural phase circuit breaker to obtain breaker response time. The monitoring device 18 is described in more detail below with respect to FIG. 3.

(2) A communications node 20 in the battery room 14 connected to the other end of the power line 12 for transmitting signals to, and receiving signals from, the plurality of monitoring devices 18. The communications node 20 is described in detail below with respect to FIG. 4.

(3) A remote host computer 22 located in a local breaker relay room. The remote host computer 22 is connected to the communications node 20 and sends signals to, and receives signals from, the communications node 20. The connection between the remote host computer 22 and the communications node 20 is an RS-232 link 23, or the like. The remote host computer 22 receives data collected from the monitoring devices 18 and stores the data in a database 24 therein. The remote host computer 22 further includes one or more application programs 26 and a display 28. The application programs 26 process and analyze the data in the database 24 and create customized displays of breaker information from the data. For example, one application program 26 is a data analyzer for determining equipment performance, determining remaining life span of the equipment, and developing predictive maintenance schedules for the equipment. In one embodiment of the invention, the remote host computer 22 is a personal computer.

(4) A local computer or node computer 30. The node computer 30 is a portable or notebook personal computer which is used by breaker unit maintenance technicians to collect, analyze and display test mode data and historical operating data on a circuit breaker 10 under test. The node computer 30 communicates with a monitoring device 18 through a direct RS-232 serial I/O port connection via an RS-232 link 32. The node computer 30 thus receives data associated with the circuit breaker 10 connected to the respective monitoring device 18. More specifically, the node computer 30 receives local test data stored in the monitoring device 18. The node computer 30 may also retrieve historical information for the respective circuit breaker 10 which was previously sent to the remote host computer 22 and which is currently stored in its database 24. The node computer 30 retrieves the circuit breaker data from the database 24 via the power line 12. The node computer 30 includes appropriate application programs (not shown) to perform these necessary functions. The node computer 30 is not permanently attached to a monitoring device 18. Rather, it is moved from monitoring device 18 (or breaker location) to monitoring device 18 by the maintenance technician. The node computer 30 may also interface directly with the remote host computer 22 in a similar manner.

(5) A central host computer 34 (FIG. 2) located off-site. The central host computer 34 communicates with the remote host computer 22 via a dial-up modem connection. The central host computer 34 provides a centralized database 35 and processing functions for a plurality of set-ups, each set-up employing components (1)–(4). The central host computer 34 includes application programs 58 and a display 60 for processing and analyzing the data in the centralized database 35 and creating customized displays of breaker information from the data. The application programs 58 may be the same or more extensive than those in the remote host computer 22.

Components (1)–(4) form a communication and data acquisition network. The power line 12 and RS-232 links 23 and 32 are the communication paths in the network. The network communicates between nodes. As described above, one node is located in the battery room at one end of the power line 12. In addition, each monitoring device 18 is a node on the network. Accordingly, each monitoring device 18 includes appropriate communications node circuitry, as described below with respect to FIG. 3. In one embodiment of the invention, there are up to 254 monitoring devices 18 on a single network, and a single remote host computer 22 per network.

Figure 2:
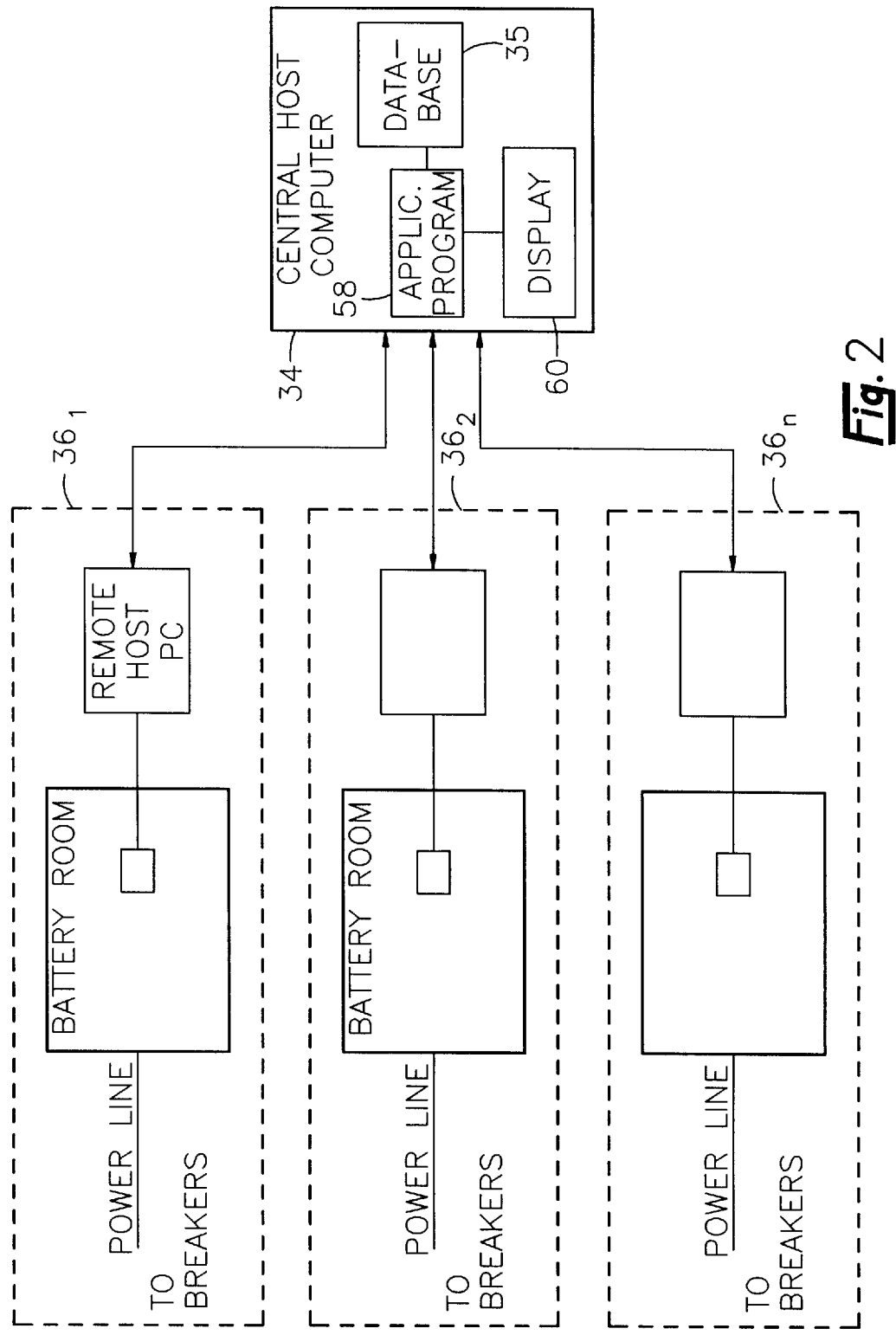
FIG. 2 is a block diagram schematic of a plurality of systems of FIG. 1, each connected to a central host computer, in accordance with another aspect of the present invention.

FIG. 2 shows a configuration wherein a central host computer 34 monitors a plurality of networks, each including the components (1)–(4). The host computer 34 thus monitors a plurality of switchyard equipment sites $36_1$, $36_2, \ldots 36_n$.

MONITORING DEVICE HARDWARE

Figure 3:
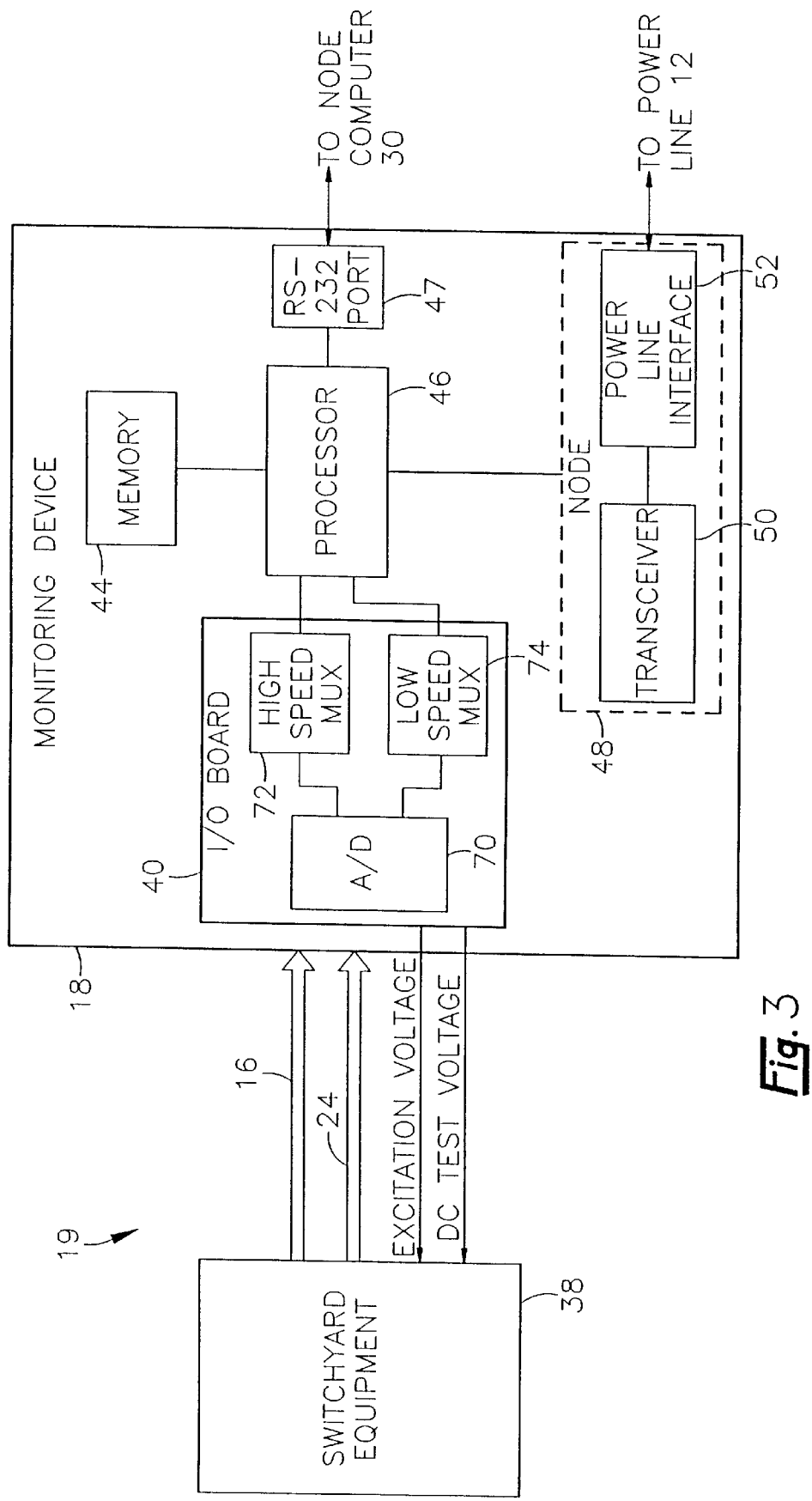
FIG. 3 is a block diagram schematic of a monitoring device used in the system of FIG. 1, shown connected to a piece of switchyard equipment.

FIG. 3 shows a monitoring device 18 connected to a piece of switchyard equipment 38, which may be a circuit breaker, transformer, or the like. The monitoring device 18 includes an I/O board 40, testing/monitoring circuitry 42, a storage device or memory 44, a processor 46, RS-232 port 47, and a node 48 for interfacing with the power line 12 (not shown). The I/O board 40 accepts up to 16 analog and up to 24 digital input signals. The I/O board 40 includes an A/D converter 70 connected to a high and a low speed multiplexer (MUX) 72 and 74 for processing the analog and digital signals. The high speed MUX 72 processes signals described below which are received on high speed channels, and the low speed MUX 74 processes signals described below which are received on low speed channels. The I/O board 40 also outputs an analog excitation voltage and a DC test voltage, as needed. These output voltages may be used, for example, to test a solenoid or to test pressure sensors or contact closures. To test a solenoid, the analog output uses a transformer isolated from the power line 12 and operating at 46 VDC. To test pressure sensors or contact closures, the analog output uses a transformer isolated from the power line 12 and operating at 10 VDC. The testing/monitoring circuitry 42 includes the necessary hardware and software for performing the testing and monitoring of the switchyard equipment. The memory 44 stores data acquired by the testing/monitoring circuitry 42. Periodically, the remote host computer 22 polls each monitoring device 18 for the data stored in the memory 44. The processor 46 controls and coordinates the functions of the monitoring device 18. The processor 46 houses software for processing trip event and close event data, and test software. The processor 46 also houses software for processing alarm events, as described more fully with respect to FIGS. 5A–5D. The RS-232 port 47 is used to interface with the node computer 30, as shown in FIG. 1. The node 48 includes a transceiver (transmitter/receiver) 50 and a power line interface 52. The power line interface 52 is connected at one end to the power line 12, and at the other end to the transceiver 50. In one preferred embodiment of the invention, the transceiver 50 is a spread spectrum power line transceiver, and the data is transmitted to and from the remote host computer 22 via the power line 12 using a spread spectrum carrier. The transceiver 50 uses spread spectrum carrier products available from Intellon Corporation, Ocala, Fla. Specifically, the transceiver 50 is an Intellon CENode PL which incorporates an Intellon CEThinx Network Controller and a CELinx pl Transceiver. The power line interface 52 is a power line coupling circuit which is constructed using a transformer and capacitor, as set forth in Intellon's CENode PL Implementation Block Diagram.

Each monitoring device 18 has a unique 32-bit address, which is composed of an 8-bit Domain address, a 16-bit unit serial number, and an 8-bit node address. The 16-bit unit serial number is contained in a read-only device and is unique to each monitoring unit 18. The monitoring unit 18 operates from input supply voltages of either 125 or 250 VDC supplied by the power line 12. A 125/250 VDC switch is provided for selecting the appropriate input supply voltage.

In one preferred embodiment of the invention wherein the monitoring device 18 is connected to a three-phase circuit breaker, the data acquisition of analog signals may have the following features:

| | |
|---|---|
| No. of Channels: | 16 (6 high speed, 8 low speed) |
| Resolution: | 8 bits |
| Sample Rate: | 1 ms, for high speed channels (8 channels sampled simultaneously) 1 second, for low speed channels (8 channels sampled simultaneously) |
| Sample Clock Frequency: | High Speed: 1 KHZ (1 ms period) Low Speed: 1 Hz (1 second period) |
| Analog Input Signals: | |
| (RTD) Ambient Air Temperature | −39 to +122° C. |
| Sensor voltage output: | TBD |
| (CT1) Current Transformer, Phase A | 0–100 mv RMS (0 to 2000 amps) |
| Sensor voltage output: | |
| (CT2) Current Transformer, Phase B | 0–100 mv RMS (0 to 2000 amps) |
| Sensor voltage output: | |
| (CT3) Current Transformer, Phase C | 0–100 mv RMS (o to 2000 amps) |
| Sensor voltage output: | |
| (P1) Pressure No. 1 | 0–100 mv |
| (P2) Pressure No. 2 (optional) | 0–100 mv |
| (TRIP) Solenoid Voltage Voltage: | 125 VDC 250 VDC |
| (CLOSE) Close Solenoid Voltage Voltage: | 125 or 250 VDC |
| (PD) Piston Displacement Voltage: | 1–5 volts |
| Test Mode DC voltage Phase A | 0–100 VDC |
| Test Mode DC voltage Phase B | 0–100 VDC |
| Test Mode DC voltage Phase C | 0–100 VDC |
| Low Speed Channels: | RTD Ambient air Temperature CT1 Current Transformer phase A CT2 Current Transformer phase B CT3 Current Transformer phase C P1 Pressure No. 1 P2 Pressure No. 2 |
| High Speed Channels: | CT1 Current Transformer phase A CT2 Current Transformer phase B CT3 Current Transformer phase C Piston Displacement Voltage Test Mode DC voltage phase A Test Mode DC voltage phase B Test Mode DC voltage phase C |
| Contact Closure Inputs: | |
| No. of lines: | 24 |
| Type: | Dry contact |
| Excitation voltage: (supplied by transmitter) | +10 VDC |

COMMUNICATIONS NODE 20 HARDWARE

Figure 4:
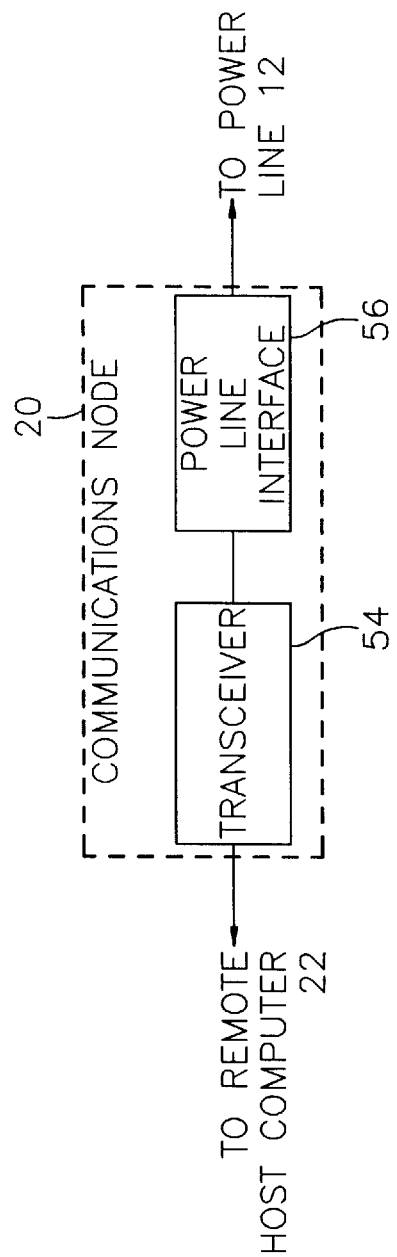
FIG. 4 is a block diagram schematic of a communications node for use in the system of FIG. 1.

FIG. 4 shows the hardware associated with the communications node 20. The hardware is essentially the same as the hardware of the node 48 in the monitoring device 18. Thus, the communications node 20 includes a transceiver 54 and a power line interface 56 of similar construction as described above.

NETWORK DESCRIPTION

When using the Intellon products to build the network, the network is patterned after the seven-layer OSI network model which includes a physical layer, data link, network layer, transport layer, session layer, presentation layer, and application layer. The physical layer is provided by the Intellon CEBus powerline carrier hardware with an appropriate interface to the 125/250 VDC power line 12. The data link and network layers are provided by the Intellon CEBus standard implementation. The transport and session layers are provided by custom software which uses the Intellon network layer facilities to define a series of acknowledged protocols for communicating messages between the remote host computer 22 and the monitoring devices 18. The presentation and application layers are provided by custom software that implements the acquisition, interpretation and storage of data.

MESSAGE TYPES AND COMMUNICATIONS PROTOCOL

After a network of monitoring devices 18, a communications node 20 and a remote host computer 22 is installed and configured, communications between the remote host computer 22 and each monitoring device 18 are initiated. Communications occur by asynchronously polling each monitoring device 18 by the remote host computer 22. That is, a monitoring device 18 speaks to a remote host computer 22 only in response to a specific request by the remote host computer 22. A monitoring device 18 does not place any data packets on the network unless and until specifically requested to do so by the remote host computer 22. To achieve maximum network reliability, all message communications are acknowledged. The transport and session layer message protocols are defined as follows:

ACTIVATE
EVENT POLL
ROUTINE POLL
TEST MODE

ACTIVATE

Once the monitoring devices 18 have been installed and powered ON, and all network configuration information has been entered into the remote host computer 22, each monitoring device 18 must be activated before it can begin to acquire data and be allowed to respond to requests for data from the remote host computer 22. The remote host computer 22 activates a monitoring device 18 by sending it an ACTIVATE MESSAGE, and subsequently receiving an ACTIVATE ACKNOWLEDGE message therefrom. If the remote host computer 22 does not receive an acknowledge message from the monitoring device 18 within a specified period of time, another ACTIVATE message is sent. If no acknowledgement is received from the monitoring device 18 after a predetermined number of ACTIVATE messages have been sent, the remote host computer 22 generates an error message which is written to an error file in the remote host computer 22. The remote host computer 22 activates all monitoring devices 18 on the network until each monitoring device 18 has been properly activated or until an error condition is generated for that monitoring device 18. As new monitoring devices 18 are added to the network, or defective monitoring devices 18 are replaced, the remote host computer 22 automatically activates them after the network configuration table (described below) has been manually updated.

NETWORK CONFIGURATION TABLE DEFINITION

1. Monitoring device Address (32 bit) format: ddd.sss.sss.nnn where: ddd=domain, 8 bit (0-255)
sss.sss=unit serial number code (16 bit)
nnn=network address 8-bit (0-255)

2. Command: Activate or Deactivate
3. Status: active, inactive, error
4. Location I.D.: (some physical location identifier)

EVENT DEFINITION

An event is defined as a state transition involving either of the following operations:

| | |
|---|---|
| Closed to Open | (Trip Event) |
| Open to Closed | (Close Event) |

The beginning of a TRIP EVENT is defined as that instant of time at which the voltage across the trip solenoid coil reaches a predefined DC voltage threshold. The end of the trip event is defined as that instant of time at which the current on all three phases (A, B and C) reads zero for at least five consecutive samples (e.g., 5 ms.). The zero current threshold is defined as less than three A/D counts (i.e., 3×2000/256=23.4 amps).

The beginning of a CLOSE EVENT is defined as that instant of time at which the voltage across the close solenoid coil reaches a predefined DC voltage threshold. The end of the close event is defined as that instant of time at which the current on all three phases (A, B and C) has reached a value of at least three A/D counts (i.e., 23.4 amps).

EVENT POLL

Upon completion of the activate sequence, the remote host computer 22 begins polling each monitoring device 18 to determine if an "event" has occurred. Possible event types are:

TRIP Event
CLOSE Event
COMPRESSOR Event

An EVENT POLL MESSAGE is sent to each active monitoring device 18 on the network. When a monitoring device 18 receives an EVENT POLL MESSAGE, it sends an EVENT POLL ACKNOWLEDGE message back to the remote host computer 22. This acknowledge message contains a status word containing the following information:

(1) If any new events have occurred since the last EVENT POLL
(2) Total number of Events to report
(3) Present mode: Test or Routine
(4) Database query request flag If the remote host computer 22 does not receive the EVENT POLL ACKNOWLEDGE message from a particular monitoring device 18 within a specified period of time, the remote host computer 22 proceeds to poll other monitoring devices 18 and picks up the unacknowledged monitoring device 18 on the next pass. This process does not present a problem since the event poll is conducted on a more or less continuous basis. If, however, a particular monitoring device 18 does not respond with an EVENT POLL ACKNOWLEDGE message after a predetermined number of event polls, then the remote host computer 22 generates an error entry in an ERROR FILE and sets the status of the particular monitoring device 18 to "error" in the network configuration table.

When the remote host computer 22 encounters a monitoring device 18 that has events to report, it sends the monitoring device 18 a SEND EVENT DATA MESSAGE, requesting the monitoring device 18 to send the earliest event that it has stored. Upon receipt of the SEND EVENT DATA message, the monitoring device 18 sends the event data block to the remote host computer 22 and waits for an EVENT DATA ACKNOWLEDGE message back from the remote host computer 22. If the monitoring device 18 does not receive an acknowledgement from the remote host computer 22, the monitoring device 18 waits for another SEND EVENT DATA MESSAGE from the remote host computer 22. The monitoring device 18 does not flush any event data until it has received an acknowledgement from the remote host computer 22 indicating that the data has been successfully transferred. The communications protocol for event polling may be summarized as follows:

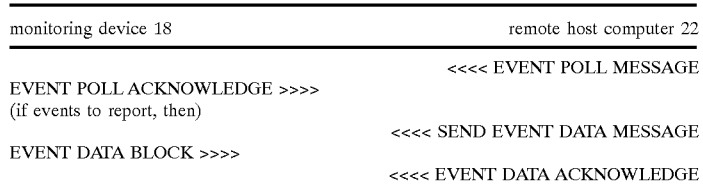

ROUTINE POLL

Every hour, such as at the top of the hour, the remote host computer 22 conducts a Routine Poll sequence to retrieve routine data from each monitoring device 18. Each monitoring device 18 is polled individually by the remote host computer 22 and asked to send its ROUTINE DATA BLOCK. Upon receipt of a SEND ROUTINE DATA MESSAGE from the remote host computer 22, the monitoring device 18 sends the routine data block to the remote host computer 22 and waits for a ROUTINE DATA ACKNOWLEDGE message back from the remote host computer 22. If the monitoring device 18 does not receive an acknowledgement from the remote host computer 22, it waits for another SEND ROUTINE DATA MESSAGE from the remote host computer 22. The monitoring device 18 does not flush any routine data until it has received an acknowledgement from the remote host computer 22 indicating that the data has been successfully transferred. If a ROUTINE DATA BLOCK is not received from the monitoring device 18 within a specified period of time, the remote host computer 22 polls the next monitoring device 18 on the network until all monitoring devices 18 have been polled at least once. The remote host computer 22 then re-polls any monitoring device 18 from which no routine data has been received. The routine poll continues until routine data has been received from all monitoring devices 18. If, however, a particular monitoring device 18 does not respond with a routine data block message after a predetermined number of routine polls, then the remote host computer 22 generates an error entry in the ERROR FILE and sets the status of the monitoring device 18 to "error" in the network configuration table. The communications protocol for routine polling may be summarized as follows: monitoring device 18 remote host computer 22

TEST MODE

A monitoring device 18 enters the Test Mode in response to a command from a node computer 30 (typically operated by a maintenance technician) connected to the monitoring unit's local RS-232 port. However, the Test Mode is not entered if there is unread event data in the monitoring device 18. All event data must be uploaded to the remote host computer 22 before the Test Mode is entered. Upon entering the Test Mode, the monitoring device 18 sets a flag in the next EVENT POLL ACKNOWLEDGE message that it sends back to the remote host computer 22, thus notifying the remote host computer 22 that the monitoring device 18 is in the Test Mode. The monitoring device 18 also suspends accumulation of routine data. Upon detecting the Test Mode flag for a particular monitoring device 18, the remote host computer 22 immediately conducts a routine poll of that monitoring device 18 to collect any remaining routine data accumulated since the last routine poll. The remote host computer 22 continues to send EVENT POLL messages to the monitoring device 18 in the Test Mode. As long as the monitoring device 18 is in a Test Mode, it responds to EVENT POLL messages by indicating that it is "busy"(i.e., in the Test Mode).

Test events are sent to the remote host computer 22 in the same manner as event data, except that the communications are tagged as TEST EVENTS.

The node computer 30 is adapted to access information from the database 24 of the remote host computer 22 by sending requests through the monitoring device 18 to the remote host computer 22, via the power line 12. The database requests and responses thereto are communicated through the nodes 20 and 48 using the spread spectrum power line transceivers 50 and 54 and spread spectrum carrier described above. The database request from the node computer 30 causes a flag to be set in the EVENT POLL ACKNOWLEDGE status word. The remote host computer 22 then polls the monitoring device 18 to ask what specific data is desired, using a SEND DATABASE QUERY message. The monitoring device 18 responds with a DATABASE QUERY MESSAGE which specifies the database records desired. Next, the remote host computer 22 sends the DATABASE INFORMATION (which may comprise a number of data packets), and then waits for a DATABASE ACKNOWLEDGE message from the monitoring device 18, verifying that the DATABASE INFORMATION message was correctly received.

The Test Mode is exited by issuing a command at the node computer 30, which is passed on to the monitoring device

18. If the monitoring device 18 has successfully uploaded all test data to the remote host computer 22, the test data memory is flushed before returning to the routine poll mode. Next, the monitoring device 18 clears the Test Mode flag in the Event Poll acknowledge status word, and resumes collection of routine data. The remote host computer 22 then updates the monitoring device 18 mode to "routine" in the network configuration table, and routine polling of the monitoring device 18 resumes at the next hourly poll. The communications protocol for the Test Mode may be summarized as follows:

```
monitoring device 18                                    remote host computer 22
                                           <<<< EVENT POLL MESSAGE
EVENT POLL ACKNOWLEDGE >>>>
(with Test Mode flag set)
                                           <<<< SEND ROUTINE DATA MESSAGE
ROUTINE DATA BLOCK >>>>
                                           <<<< ROUTINE DATA ACKNOWLEDGE
              -------------------
         <<<< EVENT POLL MESSAGES and ACKNOWLEDGES >>>>
              -------------------
(if test events to report, then)
                                           <<<< SEND TEST EVENT DATA MESSAGE
TEST EVENT DATA BLOCK >>>>
                                           <<<< TEST EVENT DATA ACKNOWLEDGE
              -------------------
         <<<< EVENT POLL MESSAGES and ACKNOWLEDGES >>>>
              -------------------
(if database query request, then)
                                           <<<< SEND DATABASE QUERY
DATABASE QUERY MESSAGE >>>>
                                           <<<< DATABASE INFORMATION
DATABASE ACKNOWLEDGE >>>>
              -------------------
(to exit test mode)
                                           <<<< EVENT POLL MESSAGE
EVENT POLL ACKNOWLEDGE >>>>
(with Test Mode flag cleared)
```

Once the desired test data is obtained by the node computer 30, but before the Test Mode is exited, the maintenance technician runs application programs in the node computer 30 to obtain immediate feedback regarding the switchyard equipment. The node computer 30 is also used to access historical data from the database 24 of remote host computer 22, as described above. The node computer 30 compares the new test data with the historical data to set new alarm thresholds and baselines for the particular piece of switchyard equipment. A specific example of how test data is generated and used when rebuilding a breaker is provided below.

TRANSMITTER ROUTINE AND EVENT DATA BLOCK STRUCTURES

1. Routine Data. No events to report. Upon receiving a SEND ROUTINE DATA MESSAGE from the remote host computer 22 (that it is the top of the hour), the monitoring device 18 computes and stores averaged values of temperature and pressure, and the accumulated amp-hours for each phase since the last routine poll. Next, the monitoring device 18 sends this information to the remote host computer 22 as a ROUTINE DATA BLOCK. The remote host computer 22 then stores this information in the ROUTINE FILE which is subsequently read by the database manager and incorporated into the database 24. The structure of the ROUTINE DATA BLOCK is as follows:

(2 byte) Routine Status word (0–65535)   Bit-Mapped value for Routine status indicators
(1 byte) Temperature        (0–255 counts)
(1 byte) #1 Tank Pressure   (0–255 counts)
(1 byte) #2 Tank Pressure   (0–255 counts)
(3 byte) Phase A Amp-Hours (0–1.7 Ma)
(3 byte) Phase B Amp-Hours (0–1.7 Ma)

-continued (3 byte) Phase C Amp-Hours (0–1.7 Ma)

14 bytes total

| Routine Status | | |
|---|---|---|
| Bit # | Definition | |
| 0 (LSB) | 0-Routine Mode 1 - | Test Mode |
| 1 | Data Block Type: | 001-Routine |
| 2 | | 010-Trip Event |
| 3 | | 011-Close Event |
| | | 100-Test Trip Event |
| | | 101-Test Close Event |
| | | 111-Compressor Event |
| 4 | Hi Temperature Alarm | |
| 5 | Lo Temperature Alarm | |
| 6 | #1 Compressor On | |
| 7 | #1 Tank Lo Pressure Alarm | |
| 8 | #1 Tank Hi Pressure Alarm | |
| 9 | #2 Compressor On | |
| 10 | #2 Tank Lo Pressure Alarm | |
| 11 | #2 Tank Hi Pressure Alarm | |

2. Trip Event. Defined as the instant in time at which the voltage across the trip solenoid reaches a preset threshold and ending at the instance in time at which the current on all three phases (A, B and C) has read zero for 5 consecutive samples (i.e., 5 ms).

The EVENT DATA BLOCK structure for a Trip Event is as follows:

| | | | |
|---|---|---|---|
| (2 byte) Event Status word | (0–65535) | Bit-Mapped value for Event status indicators (see Trip/Close Status below) |
| (1 byte) Event counter | (0–255) | Stored events in monitoring device 18 from previous poll |
| (2 byte) Events since last Test | (0–65535) | Total events since last maintenance test |
| (1 byte) Total Event Time | (0–255 ms) | Total time of event from start to finish |
| (1 byte) Phase A-B Delay Time | (0–255 ms) | Time difference between phase A & B reaching 0 value |
| (1 byte) Phase A-C Delay Time | (0–255 ms) | Time difference between phase A & C reaching 0 value |
| (1 byte) Phase B-C Delay Time | (0–255 ms) | Time difference between phase B & C reaching 0 value |
| (2 byte) Phase A Current | (0–65535) | Instantaneous current value on Phase A at Start time |
| (2 byte) Phase B Current | (0–65535) | Instantaneous current value on Phase B at Start time |
| (2 byte) Phase C Current | (0–65535) | Instantaneous current value on Phase C at Start time |
| (1 byte) #1 Tank Pressure | (0–255 counts) | Tank #1 pressure at Event start time |
| (1 byte) #2 Tank Pressure | (0–255 counts) | Tank #2 pressure at Event start time (0 if N/A) |
| (1 byte) Event Temperature | (0–255 counts) | Temperature at Event start time |
| (3 byte) Event Age | (0–194 days) | Elapsed seconds since the Event start time |
| 21 bytes total | | |

3. Close Event. Defined as the instant in time at which the voltage across the close solenoid reaches a preset threshold and ending at the instant in time at which the current on all three phases (A, B and C) has reached a value of at least 3 a/d counts. (i.e. 23 amps on a 0–2000 amp CT with 8-bit resolution)

The EVENT DATA BLOCK structure for a Close Event is as follows:

| | | | |
|---|---|---|---|
| (2 byte) Trip/Close Event Status | (0–65535) | Bit-Mapped value for Event status indicators (see Trip/Close Status below) |
| (1 byte) Event counter | (0–255) | Stored events in monitoring device 18 from previous poll |
| (2 byte) Events since last Test | (0–65535) | Total events since last maintenance test |
| (1 byte) Total Event Time | (0–255 ms) | Total time of event from start to finish |
| (1 byte) Phase A-B Delay Time | (0–255 ms) | Time difference between phase A & B x ms after Event Start |
| (1 byte) Phase A-C Delay Time | (0–255 ms) | Time difference between phase A & C x ms after Event Start |
| (1 byte) Phase B-C Delay Time | (0–255 ms) | Time difference between phase B & C x ms after Event Start |
| (2 byte) Phase A Current | (0–65535) | Instantaneous current value on Phase A at Finish time |
| (2 byte) Phase B Current | (0–65535) | Instantaneous current value on Phase B at Finish time |
| (2 byte) Phase C Current | (0–65535) | Instantaneous current value on Phase C at Finish time |
| (1 byte) #1 Tank Pressure | (0–255 counts) | Tank #1 pressure at Event start time |
| (1 byte) #2 Tank Pressure | (0–255 counts) | Tank #2 pressure at Event start time (0 if N/A) |
| (1 byte) Event Temperature | (0–255 counts) | Temperature at Event start time |
| (3 byte) Event Age | (0–194 days) | Elapsed seconds since the Event start time |
| 21 bytes total | | |

| Routine Status | | |
|---|---|---|
| Bit # | Definition | |
| 0 (LSB) | 0-Routine Mode 1 - | Test Mode |
| 1 | Data Block Type: | 001-Routine |
| 2 | | 010-Trip Event |
| 3 | | 011-Close Event |
| | | 100-Test Trip Event |
| | | 101-Test Close Event |
| | | 111-Compressor Event |
| 4 | Hi Temperature Alarm | |
| 5 | #1 Tank Compressor On | |
| 6 | #1 Tank Lo Pressure Alarm | |
| 7 | #1 Tank Hi Pressure Alarm | |
| 8 | #2 Tank Compressor On | |
| 9 | #2 Tank Lo Pressure Alarm | |
| 10 | #2 Tank Hi Pressure Alarm | |
| 11 | Maximum event time exceeded | |
| 12 | Phase A-B maximum (open/close) delay time exceeded | |
| 13 | Phase A-C maximum (open/close) delay time exceeded | |
| 14 | Phase B-C maximum (open/close) delay time exceeded | |

4. Compressor Event. Defined as the instant in time at which a running average of 5 sec. slope exceeds (+). and ending at the instant in time at which a running average of 5 sec. slope is less than or equal to (+).

The EVENT DATA BLOCK structure for a Compressor Event is as follows:

| | | | |
|---|---|---|---|
| (2 byte) Compressor Event Status | (0–65535) | Bit-Mapped value for Event status indicators |
| (1 byte) Event counter | (0–255) | Stored events in monitoring device 18 from previous poll |
| (2 byte) Events since last Test | (0–65535) | Accumulative Charge cycles since last maintenance test |
| (2 byte) Total Run Time | (0–65535 sec) | Total Compressor run time from start to finish |
| (1 byte) Event Temperature | (0–255 counts) | Temperature at Event start time |
| (3 byte) Event Age | (0–194 days) | Elapsed seconds since event start time |
| 11 bytes total | | |

| Compressor Event Status | | |
|---|---|---|
| Bit # | Definition | |
| 0 (LSB) | 0-Routine Mode 1 - | Test Mode |
| 1 | Data Block Type: | 001-Routine |
| 2 | | 010-Trip Event |
| 3 | | 011-Close Event |
| | | 100-Test Trip Event |
| | | 101-Test Close Event |
| | | 111-Compressor Event |

-continued

| | | |
|---|---|---|
| 4 | 0-#1 Compressor Event 1-#2 Compressor Event | |
| 5 | Hi Temperature Alarm | |
| 6 | Lo Temperature Alarm | |
| 7 | Tank Compressor On | |
| 8 | Tank Lo Pressure Alarm | |
| 9 | Tank Hi Pressure Alarm | |
| 10 | Maximum Run-Time Exceeded | |

5. Test Trip Event. In the Test Mode, a Test Trip Event is defined as the instant in time at which the voltage across the close solenoid reaches a preset threshold, and ending at the instant in time at which the current on all three phases (A, B and C) has reached a value of (p+−3 a/d counts) for at least 5 consecutive samples (i.e. 5 ms).

The data structure for the Test Trip event is identical to that for the Test Close event described below.

6. Test Close Event. In the transmitter Test Mode a Test Close Event is defined as the instant in time at which the voltage across the close solenoid reaches a preset threshold, and ending at the instant in time at which the current on all three phases (A, B and C) has reached a value of at least 23 amps (3 a/d counts).

The data reported during either a Test Trip Event or a Test Close Event is as follows:

| | | | |
|---|---|---|---|
| (2 byte) | Event Status Word | (0–65535) | Bit-Mapped value for Event status indicators (see Trip/Close Status below) |
| (1 byte) | Total Event Time | (0–255 ms) | Total time for all phases to reach final value |
| (1 byte) | Phase A Event Time | (0–255 ms) | Total time of phase A Event from Start to Finish |
| (1 byte) | Phase B Event Time | (0–255 ms) | Total time of phase B Event from Start to Finish |
| (1 byte) | Phase C Event Time | (0–255 ms) | Total time of phase C Event from Start to Finish |
| (320 bytes) | Phase A voltage sample set | (0–255 counts) | Sampled data set for Phase A Event |
| (320 bytes) | Phase B voltage sample set | (0–255 counts) | Sampled data set for Phase B Event |
| (320 bytes) | Phase C voltage sample set | (0–255 counts) | Sampled data set for Phase C Event |
| (1 byte) | Phase A-B Delay Time | (0–255 counts) | Time difference between phase A & B final values |
| (1 byte) | Phase A Finish sample # | (0–255 counts) | Sample # in sampled data for Finish of Phase A Event |
| (1 byte) | Phase A-C Delay Time | (0–255 counts) | Time difference between phase A & C final values |
| (1 byte) | Phase B Finish sample # | (0–255 counts) | Sample # in sampled data for Finish of Phase B Event |
| (1 byte) | Phase B-C Delay Time | (0–255 counts) | Time difference between phase B & C final values |
| (1 byte) | Phase C Finish sample # | (0–255 counts) | Sample # in sampled data for Finish of Phase C Event |
| (320 bytes) | Piston displacement sample set | (0–255 counts) | Sampled data set for Piston displacement during Event |
| (1 byte) | Event Temperature | (0–255 counts) | Temperature at Event Start time |
| (1 byte) | #1 Tank Pressure | (0–255 counts) | Tank #1 pressure at Event start time |
| (1 byte) | #2 Tank Pressure | (0–255 counts) | Tank #2 pressure at Event start time if applicable |
| 1295 total bytes | | | |

MONITORING DEVICE 18 SOFTWARE

The monitoring device 18 includes data link and network software, as well as application software. When using the Intellon products described above, the data link and network software is based on Intellon's CEBus packet communications facilities. The data link layers and network layers handle the communication of data packets between the remote host computer 22 and the monitoring device 18 over the network communications media (power line 12).

The application software is written in the C programming language, with some time critical routines written in the native assembly language of the monitoring device processor 46. The application software provides data acquisition/storage, packet construction and parsing, messaging protocols, and monitoring unit executive functions.

REMOTE HOST COMPUTER 22 SOFTWARE

The remote host computer 22 comprises appropriately configured Intel processor-based PC hardware, Microsoft Windows NT Workstation system software, network control and data collection software, and various database management and application software functions. The network control and data collection software provides (a) all communications with the monitoring devices 18 on the network, (b) data collection functions, and (c) interfacing with the database application software. The network control and data collection software also collects breaker operating, event and test data from the monitoring devices 18, and presents the data to the database application software via the following files on a hard disk of the remote host computer 22:

Routine Data File—Contains routine operating data for each active monitoring device 18 on the network.

Event Data File—Contains operating event data (trip, close, compressor) from any monitoring device 18 on which an operating event occurred.

Test Data File—Contains test event data from any breaker undergoing test or maintenance.

The network control and data collection software facilitates requests by a node computer 30 for transmission of information stored in the database 24 of the remote host computer 22 to a monitoring device 18.

NODE COMPUTER 30 SOFTWARE

The node computer 30 comprises appropriately configured portable notebook computer hardware, Microsoft Windows 3.1, Windows for Workgroups 3.11, or Windows 95 operating system software, software for interfacing with a monitoring device 18, and test applications support software. The interface software enables communications of commands and data between the monitoring device 18 and the node computer test applications software, via an RS-232 direct connection between the monitoring device 18 and node computer 30. The interface software has a foreground process to allow connection to the monitoring device 18 and downloading of set-up information, and a background process to allow the test applications support software to read test data from the monitoring device 18 and request/receive database information from the remote host computer 22.

Figure 5A:
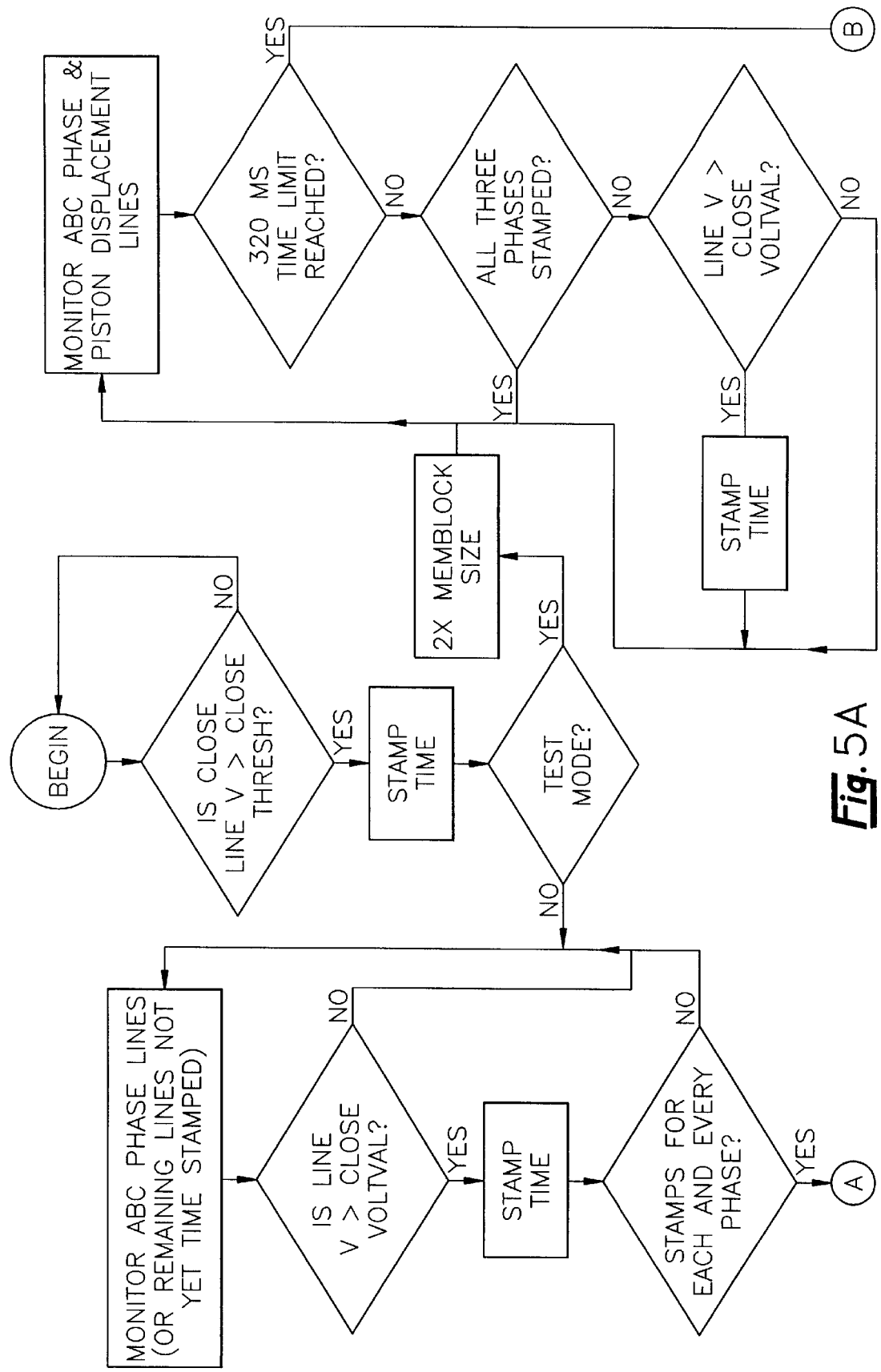
FIGS. 5A and 5B, taken together, are a first flowchart for alarm events, as programmed into the monitoring device of FIG. 3.
Figure 5C:
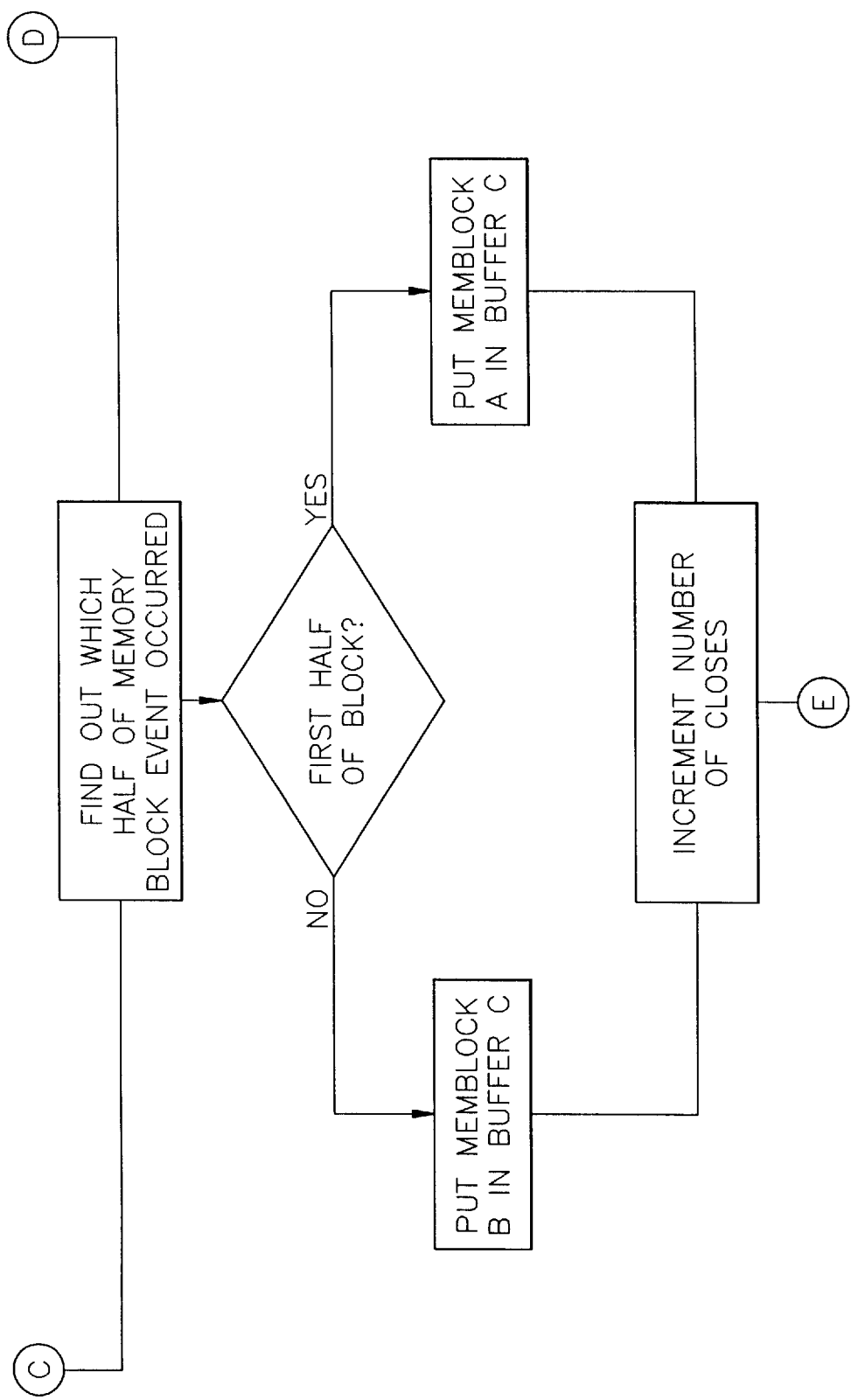
FIGS. 5C and 5J, taken together, are a second flowchart for alarm events, as programmed into the monitoring device of FIG. 3.
Figure 5D:
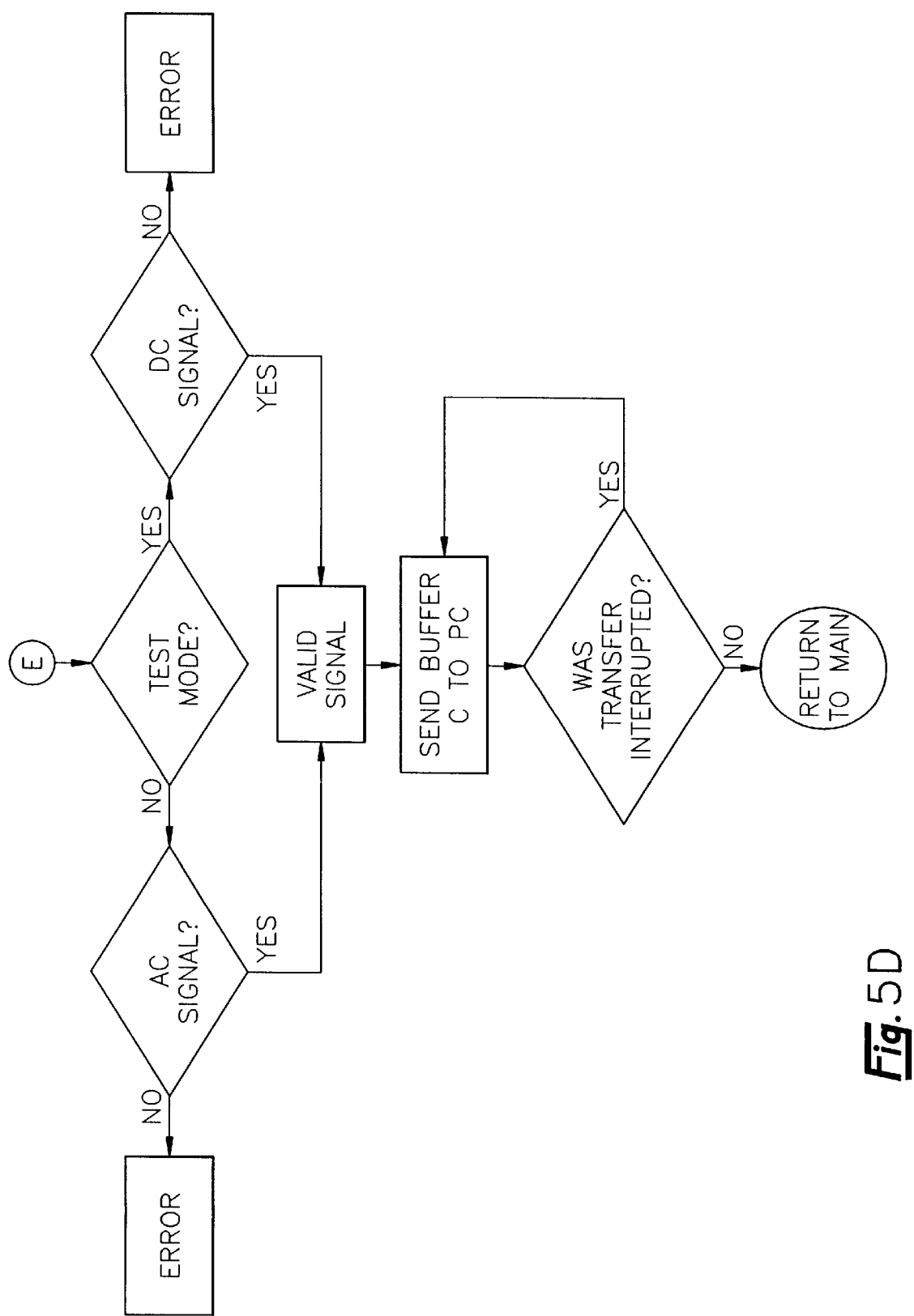
Figure 5E:
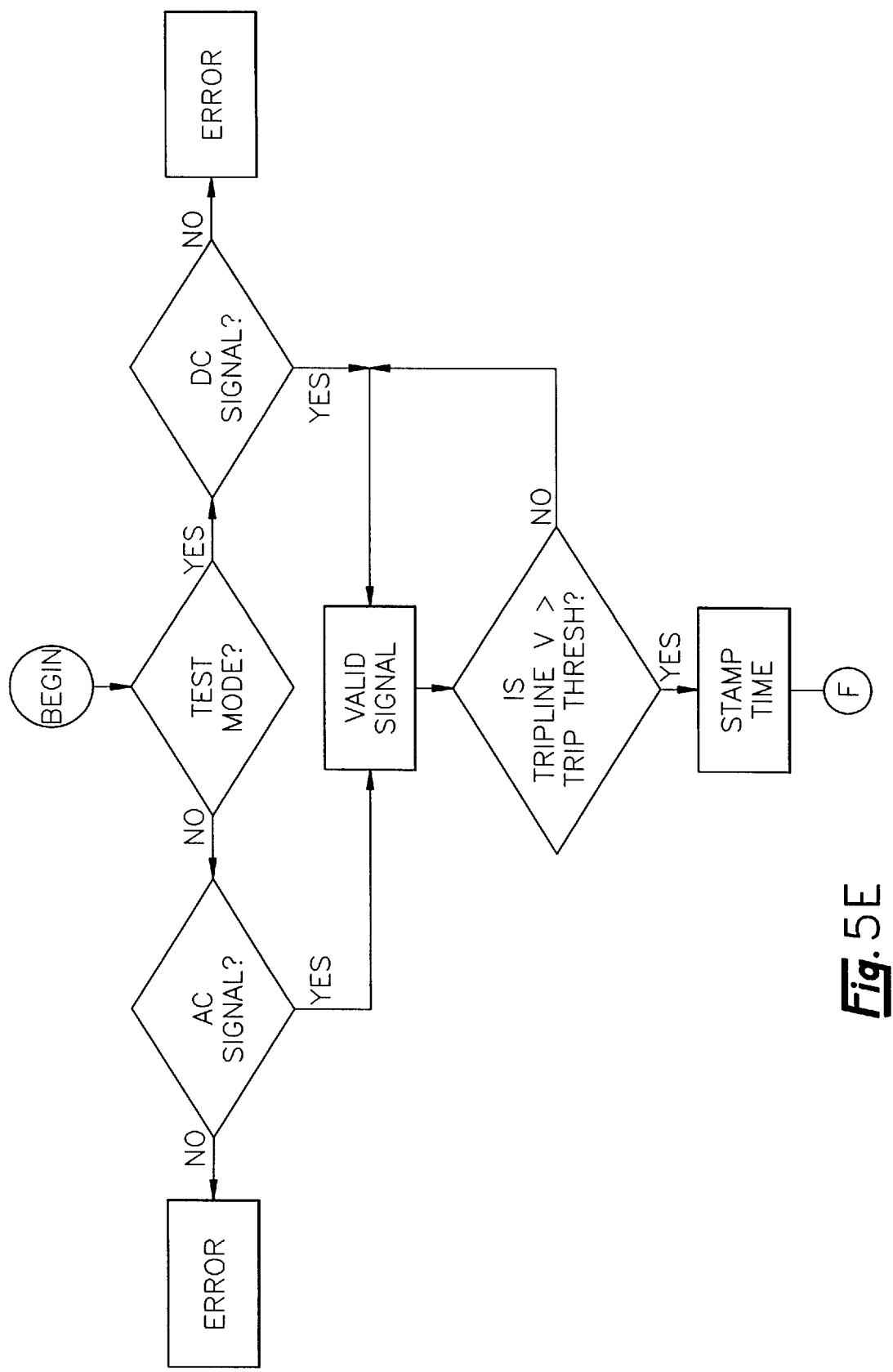
Figure 5F:
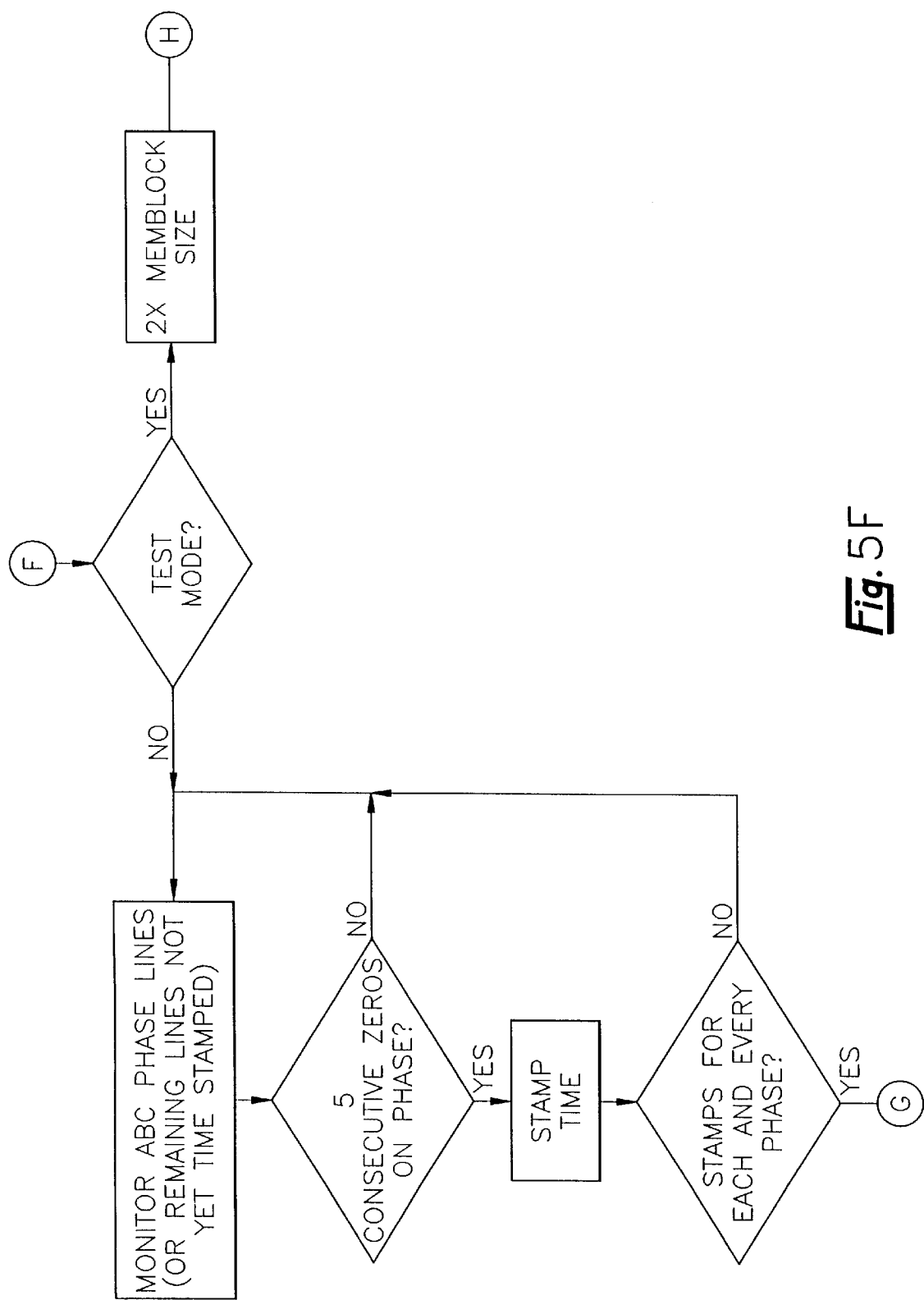
Figure 5G:
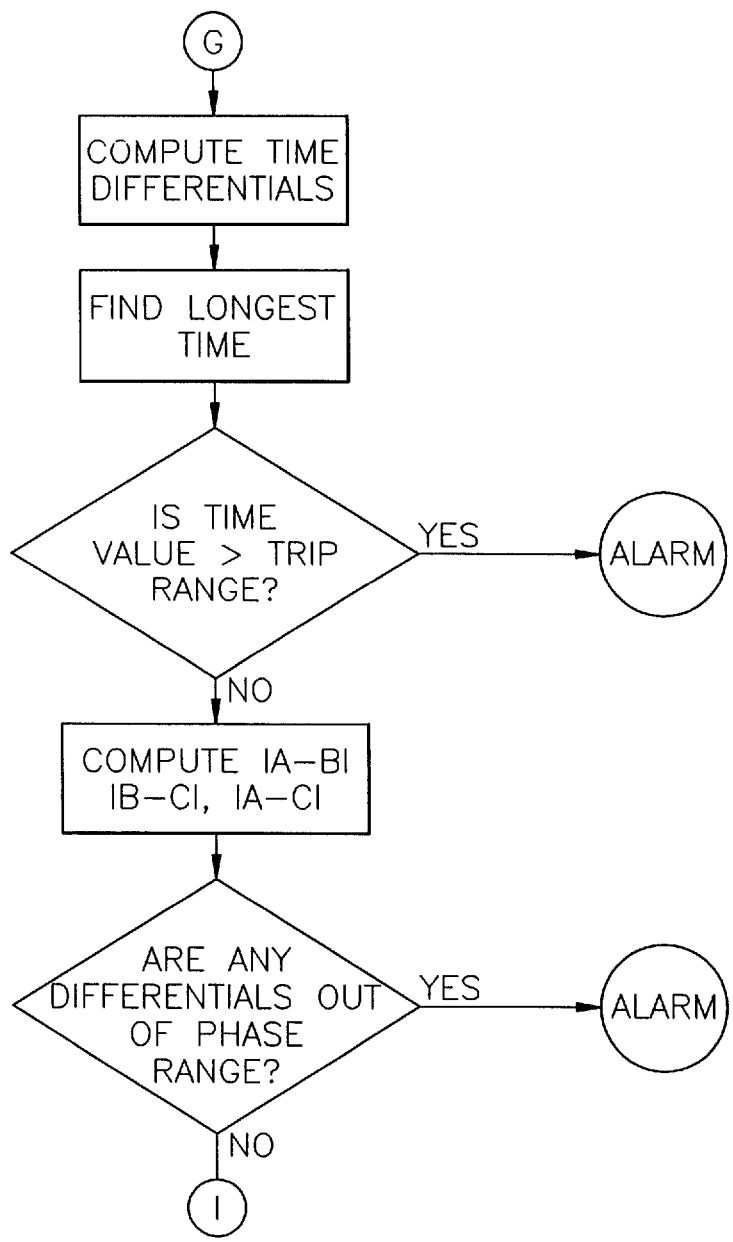
Figure 5H:
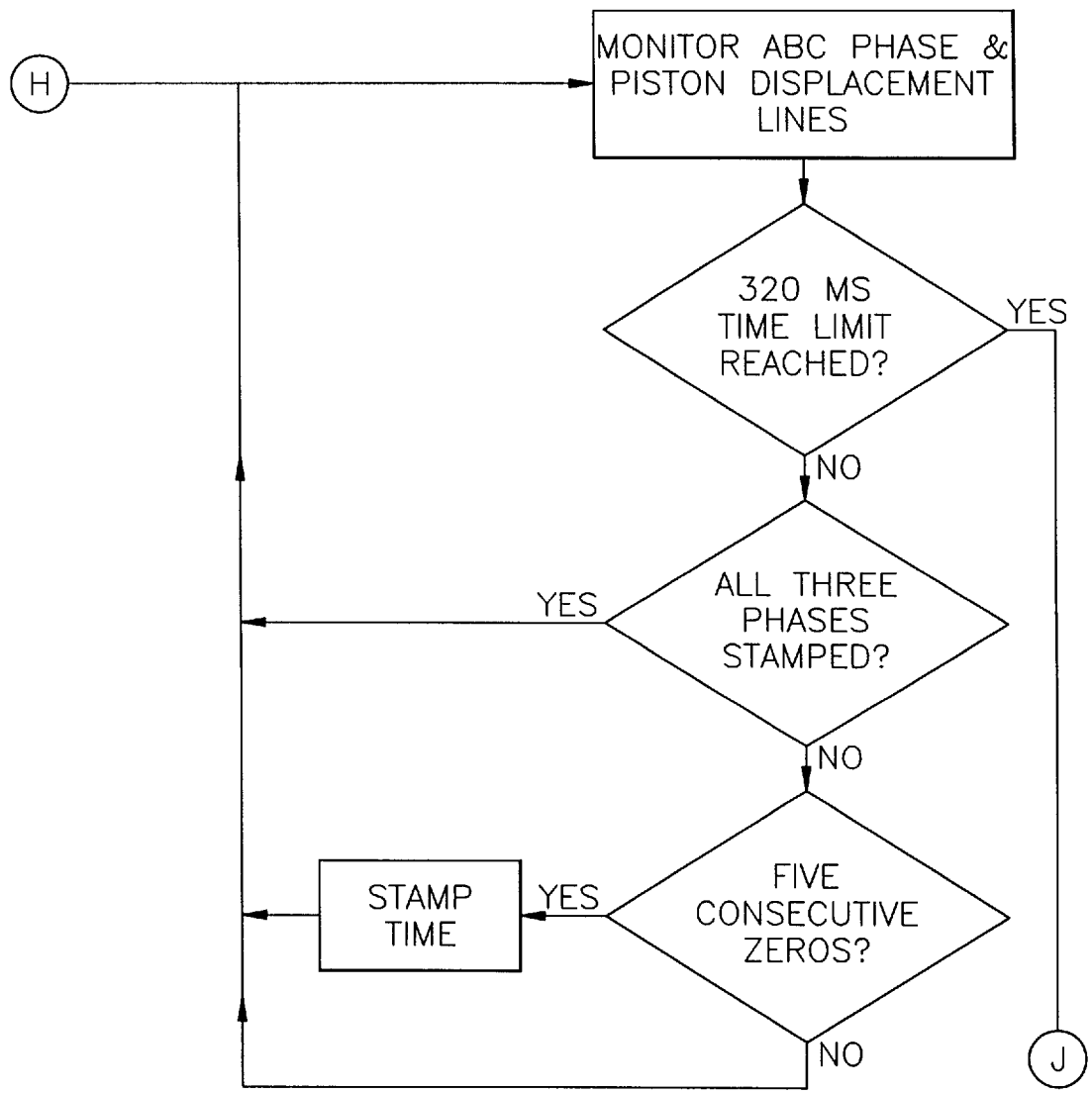
Figure 5I:
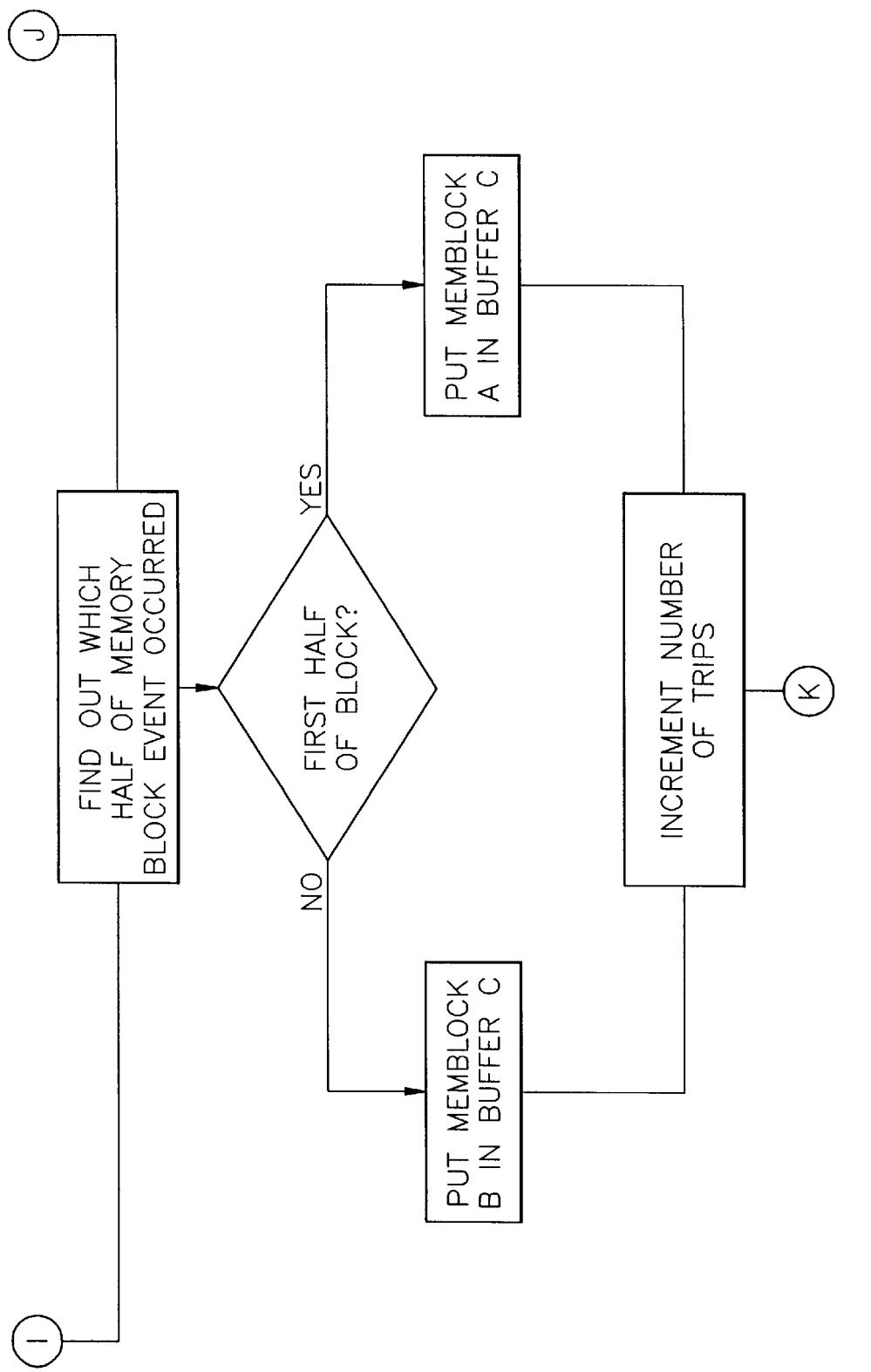

FIGS. 5A and 5B, taken together, and FIGS. 5C and 5D, taken together, each show flowcharts for alarm events for a particular piece of switchyard equipment. A software program for implementing the flowchart is programmed into one or more EPROMs in the processor 46 of the monitoring device 18. The alarms in FIGS. 5A–5D are front-end alarms which are proactively transmitted by the monitoring device 18 when triggered. That is, the monitoring device 18 does not wait for a polling signal from the remote host computer 22 or central host computer 34 to send the alarm event. Examples of these alarms were described above in the section entitled "Transmitter Routine and Event Data Block Structures".

Variables, such as thresholds, which are required for performing the steps in the flowcharts of FIGS. 5A–5D are pre-programmed into the EPROM(s) of the processor 46 when the monitoring device 18 is installed. The thresholds may be viewed and/or reprogrammed through a node computer 30 when a maintenance technician services the switchyard equipment.

In addition to front-end alarms, the application programs resident in the remote host computer 22 and central host computer 34 generate back-end alarms after processing data received from the monitoring device 18, and storing the processed data in the databases of the computers 22 and 34. The back-end alarms are typically less critical than the front-end alarms generated directly by the monitoring device 18.

FIG. 6 shows a schematic diagram of one circuit breaker installation 19 in FIG. 1. The particular circuit breaker installation illustrated herein comprises a conventional oil circuit breaker 62 having three tanks, poles or phases A, B, C. Each phase has a line side 64 and a load side 66. Each phase is controlled by a breaker mechanism 68. The mechanism 68 includes a piston 76 for tripping/closing each of the three phases. The novel monitoring device 18 of the present invention is physically bolted to the housing of the breaker mechanism 68. Electrical interconnections between the monitoring device 18 and the circuit breaker 62 are not shown in detail.

To facilitate breaker testing, output leads and cables are attached to the monitoring device 18 and connected to respective parts of the breaker 62. Specifically, one output lead is connected to a transducer or sensor 78 for measuring displacement of the piston 76 and/or for measuring displacement of contact closure mechanisms 79 inside each phase. Each phase includes a test tap for connection of the sensor 78 thereto. The sensor(s) 78 may be any prior art sensor suitable for such purposes. A multi-line output cable is connected at one set of ends to the isolated excitation voltage output of the monitoring device 18, and at the other set of ends to the line and load sides of the breaker phases A–C. The output leads and cables are removed after exiting the Test Mode.

The node computer 30, in conjunction with testing capabilities built into the monitoring device 18, allows a maintenance technician to test a piece of switchyard equipment, compare the test data to historical data, set new alarm thresholds (i.e., values in the EPROM(s) of processor 46), and set new baselines stored in the remote host computer 22. Baselines are used by the remote host computer 22 to determine when subsequent event data indicates potential problems or wear in the switchyard equipment. This feature is particularly useful when rebuilding switchyard equipment. For example, the monitoring device 18 may be configured as shown in FIG. 6 to test a plural phase circuit breaker and obtain breaker response time when rebuilding a breaker. After the breaker 62 is rebuilt, the node computer 30 is connected to the monitoring device 18 and the Test Mode is entered. The leads and cables are connected to the sensor(s) 78 and the line and load sides of the breaker phases A–C. The isolated excitation voltage is applied from the monitoring device 18 and the monitoring device 18 receives test trip event and test close event data from the breaker 62, as well as piston displacement data (i.e., breaker mechanism movement). The piston displacement data is the "piston displacement sample set" referred to above which is obtained during the test trip event and test close event. Typically, plural tests (such as eight or more) are conducted.

Figure 7:
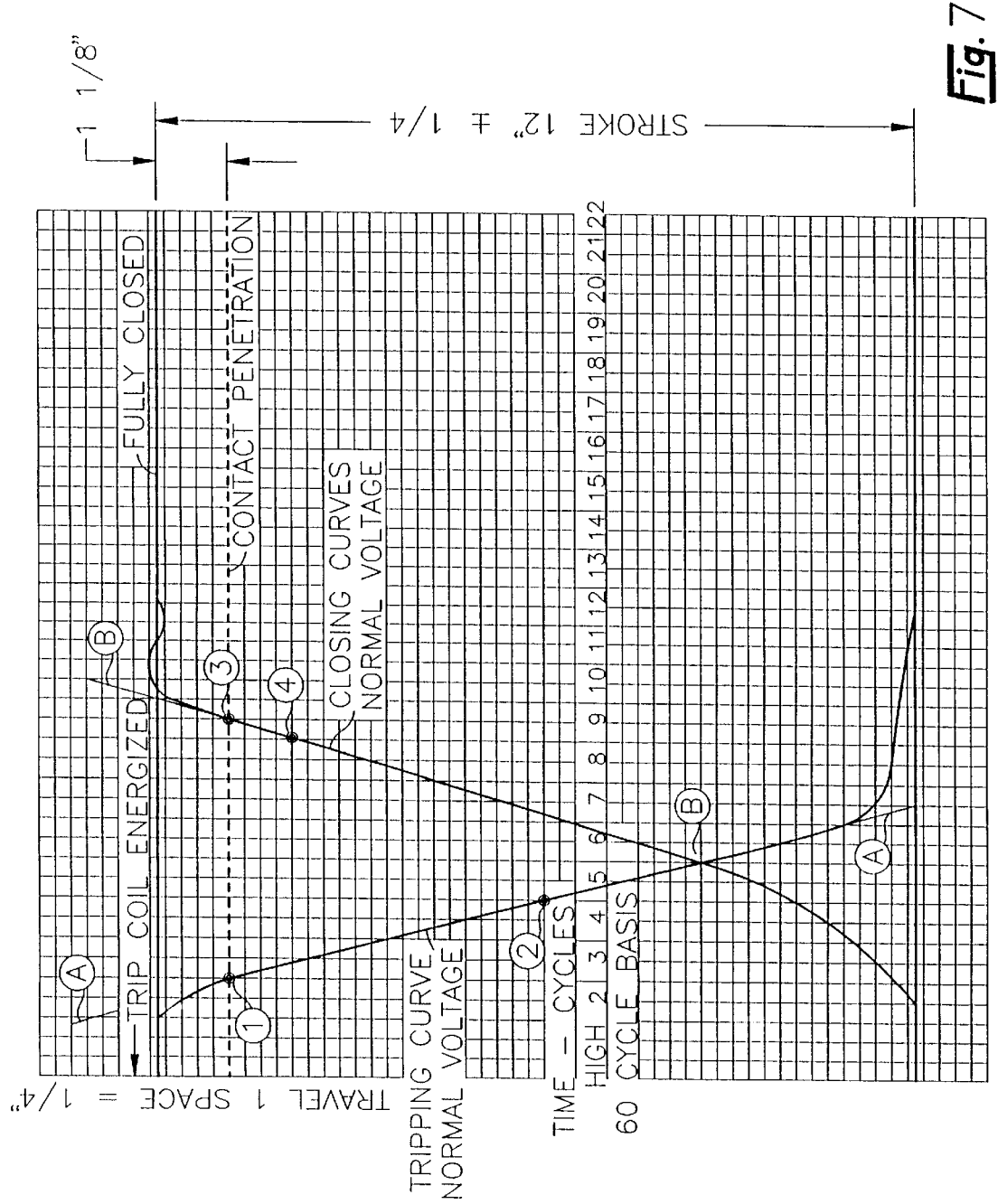
FIG. 7 is a sample mechanism displacement plot generated by using data collected by the monitoring device of FIG. 3.

The collected data is downloaded into the node computer 30. An application program in the node computer 30 creates mechanism displacement plots (trend curves) from the data. Each of the plural tests generates a plot. That is, a plot is generated for each trip and close test cycle. A sample plot is shown in FIG. 7. The maintenance technician reviews the plots and selects which plots are to be used to generate an averaged plot. Typically, four plots are selected. The node computer 30 causes the monitoring device 18 to keep the data associated with the four selected plots and to discard data associated with unselected plots. If desired, the maintenance technician compares the current averaged plot with an averaged plot generated from the previous Test Mode (i.e., historical data). To perform a current vs. historical data comparison, the historical data is downloaded to the node computer 30 from the remote host computer 22 in response to a request for data sent by the node computer 30 (through the monitoring device 18) to the remote host computer 22. The maintenance technician uses the information in the plots to set new alarm thresholds and baselines for the breaker 62. After the node computer 30 causes the monitoring device 18 to exit the Test Mode, the monitoring device 18 sends the new data associated with the four selected plots to the remote host computer 22 for storage therein and for use in setting new baselines. The new plot data will also be used for comparison purposes during the next breaker rebuild.

Heretofore, maintenance technicians could not conduct tests of breaker response time using a single, integrated piece of equipment. Instead, the technician used one piece of equipment to measure breaker mechanism movement, and separate equipment to apply excitation voltage and monitor contact closure. The data from the separate equipment was then coordinated to obtain mechanism displacement plots. Furthermore, previous plots could not be instantly downloaded for immediate, on-site comparison. The Test Mode capabilities built into the present invention dramatically improve efficiency in servicing and rebuilding switchyard equipment.

Other variations of the present invention, without limitation, are listed below:

(1) One or more of the application programs 26 which are resident in the remote host computer 22 may also be resident in the node computer 30. In this manner, a maintenance technician in the field can retrieve data from the database 24 of the remote host computer 22 and perform local analysis and display of information regarding the switchyard equipment 10. In one preferred embodiment of the invention, the application programs in the node computer 30, remote host computer 22 and central host computer 34 are identical.

(2) The node computer 30 may be directly connected to the remote host computer 22. The node computer 30 can then run application programs 26 which are stored therein using the data in the database 24, but which are not available in the remote host computer 22.

(3) In one preferred embodiment of the invention, the remote host computer 22 polls the monitoring devices 18 for new data about once per second, and the central host computer 34 polls the remote host computer 22 for new data about once every half hour or hour. However, the polling frequencies may be greater or less than these values.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX A

Table: Alarm History

Thursday, June 20, 1996
Page: 1

Properties

| | | | |
|---|---|---|---|
| Attributes: | Linked | Connect String: | ;DATABASE=C:\CSTAT\CBDATA.MDB |
| Date Created: | 6/10/96 1:25:15 PM | Def. Updatable: | False |
| Description: | Historical record of alarm events | Last Updated: | 6/10/96 1:25:15 PM |
| Order By On: | False | Record Count: | Not Available |
| Src Table Name: | Alarm History | | |

Columns

| Name | Type | Size |
|---|---|---|
| Alarm Key | Number (Long) | 4 |
| Transmitter ID | Text | 6 |
| Event Date | Date/Time | 8 |
| Alarm Condition | Number (Long) | 4 |
| Value | Number (Double) | 8 |
| Acknowledged | Yes/No | 1 |
| User | Text | 20 |
| Ack Time | Date/Time | 8 |
| Historical Data | Yes/No | 1 |

Relationships

[C:\CSTAT\CBDATA.MDB].Reference12

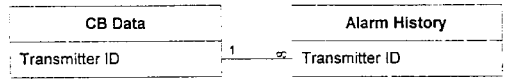

| CB Data | Alarm History |
|---|---|
| Transmitter ID | Transmitter ID |

1 —— ∞

Attributes: Enforced, Inherited, Cascade Updates, Cascade Deletes
Attributes: One-To-Many (External)

Table Indexes

| Name | Number of Fields |
|---|---|
| Ack Time | 1 |
| Fields: | Ack Time, Ascending |
| Acknowledged | 1 |
| Fields: | Acknowledged, Ascending |
| Alarm Time | 1 |
| Fields: | Event Date, Ascending |
| Historical Data | 1 |
| Fields: | Historical Data, Ascending |
| PrimaryKey | 1 |
| Fields: | Alarm Key, Ascending |

| Table: Alarm History | | Thursday, June 20, 1996 |
|---|---|---|
| Reference12 | 1 | |
| Fields: | Transmitter ID, Ascending | |
| Transmitter ID | 1 | |
| Fields: | Transmitter ID, Ascending | |

|  | Thursday, June 20, 1996 |
|---|---|
| Table: Breaker Alarm Conditions | Page: 3 |

Properties

| Date Created: | 11/23/95 6:56:17 AM | Def. Updatable: | True |
|---|---|---|---|
| Last Updated: | 11/26/95 11:04:47 AM | Record Count: | 32 |

Columns

| Name | Type | Size |
|---|---|---|
| Breaker Problem Code | Number (Long) | 4 |
| Message | Text | 255 |
| Priority | Number (Byte) | 1 |

Relationships

Reference

| Attributes: | Unique, Not Enforced |
|---|---|
| Attributes: | One-To-Many |

Table Indexes

| Name | Number of Fields |
|---|---|
| PrimaryKey | 1 |
| Fields: | Breaker Problem Code, Ascending |

|  | Thursday, June 20, 1996 |
|---|---|
| Table: Breaker Manufacturers | Page: 4 |

Properties

| Date Created: | 3/1/96 9:31:05 AM | Def. Updatable: | True |
|---|---|---|---|
| Last Updated: | 4/10/96 3:18:32 PM | Order By On: | False |
| Record Count: | 50 | | |

Columns

| Name | Type | Size |
|---|---|---|
| Vendor | Text | 25 |
| Model | Text | 20 |
| Mfgrs Recommended Max Fault Trips | Number (Byte) | 1 |
| O&M Manual File | Text | 50 |

Relationships

CB DataBreaker Manufacturers

| Attributes: | Not Enforced |
|---|---|
| Attributes: | Indeterminate |

CB DataBreaker Manufacturers1

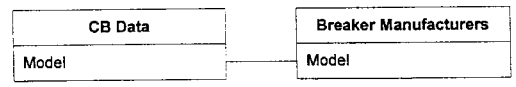

| Attributes: | Not Enforced |
|---|---|
| Attributes: | Indeterminate |

Table Indexes

| Name | Number of Fields |
|---|---|
| Model | 1 |
| Fields: | Model, Ascending |
| PrimaryKey | 2 |
| Fields: | Vendor, Ascending |
| | Model, Ascending |

Thursday, June 20, 1996
Page: 5

Table: Breaker Problems

Properties

| | | | |
|---|---|---|---|
| Attributes: | Linked | Connect String: | ;DATABASE=C:\CSTAT\CBDATA.MDB |
| Date Created: | 6/10/96 1:25:15 PM | Def. Updatable: | False |
| Description: | Holds entries for problems with current breaker | Last Updated: | 6/10/96 1:25:15 PM |
| Record Count: | Not Available | Src Table Name: | Breaker Problems |

Columns

| Name | Type | Size |
|---|---|---|
| Breaker Problem Code | Number (Long) | 4 |

Relationships

Reference

Attributes: Unique, Not Enforced
Description: One-To-Many

Table: Breaker Type

Thursday, June 20, 1996
Page: 6

Properties

| | | | |
|---|---|---|---|
| Date Created: | 3/27/96 3:07:52 PM | Def. Updatable: | True |
| Last Updated: | 3/27/96 3:07:52 PM | Order By On: | False |
| Record Count: | 6 | | |

Columns

| Name | Type | Size |
|---|---|---|
| Breaker Type | Number (Integer) | 2 |
| Breaker Description | Text | 20 |

Relationships

CB DataBreaker Type

| Attributes: | Not Enforced |
|---|---|
| Attributes: | Indeterminate |

Table Indexes

| Name | Number of Fields |
|---|---|
| PrimaryKey | 1 |
| Fields: | Breaker Type, Ascending |

| | Thursday, June 20, 1996 |
|---|---|
| Table: CB Data | Page: 7 |

Properties

| | | | |
|---|---|---|---|
| Attributes: | Linked | Connect String: | ;DATABASE=C:\CSTAT\CBDATA.MDB |
| Date Created: | 6/10/96 1:25:15 PM | Def. Updatable: | False |
| Description: | Main breaker data table | Last Updated: | 6/13/96 8:35:40 AM |
| Order By On: | False | Record Count: | Not Available |
| Src Table Name: | CB Data | Validation Rule: | [Drive Hi Range]>=[Drive Lo Range] And [Gas Compressor Hi Range]>=[Gas Compressor Lo Range] |

Columns

| Name | Type | Size |
|---|---|---|
| Breaker Tag | Text | 12 |
| Transmitter ID | Text | 6 |
| Type | Number (Integer) | 2 |
| Vendor | Text | 25 |
| Model | Text | 20 |
| Serial | Text | 15 |
| Description | Text | 32 |
| District | Text | 20 |
| Branch | Text | 20 |
| Group | Text | 6 |
| Location | Text | 20 |
| Installed | Date/Time | 8 |
| Last Service | Date/Time | 8 |
| Amperage Rating | Number (Single) | 4 |
| Line Voltage | Number (Single) | 4 |
| Drive Type | Number (Byte) | 1 |
| Gas Compressor Type | Number (Byte) | 1 |
| Drive Lo Range | Number (Single) | 4 |
| Drive Hi Range | Number (Single) | 4 |
| Gas Compressor Lo Range | Number (Single) | 4 |
| Gas Compressor Hi Range | Number (Single) | 4 |
| Priority | Number (Byte) | 1 |
| Remote Operation | Yes/No | 1 |
| Event Type | Number (Integer) | 2 |
| Last Event | Date/Time | 8 |
| Alarm Condition | Number (Long) | 4 |
| Breaker Duty Life | Number (Double) | 8 |
| Breaker Duty Load | Number (Double) | 8 |
| Drive Duty Cycle | Number (Double) | 8 |
| Drive Charge Rate | Number (Double) | 8 |
| Gas Compressor Duty Cycle | Number (Double) | 8 |
| Gas Compressor Charge Rate | Number (Double) | 8 |
| Max Fault Current | Number (Double) | 8 |

Table: CB Data                                                                           Thursday, June 20, 1996
                                                                                                      Page: 8

Relationships

[C:\CSTAT\CBDATA.MDB].CB DataCommunications Data

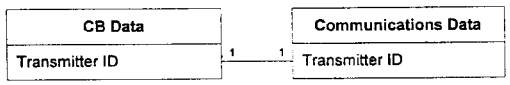

Attributes:      Unique, Enforced, Inherited, Cascade Updates, Cascade Deletes
Attributes:      One-To-One (External)

[C:\CSTAT\CBDATA.MDB].CB DataMaintenance Activity

Attributes:      One-To-Many (External)
Attributes:      Enforced, Inherited, Cascade Updates

[C:\CSTAT\CBDATA.MDB].Reference

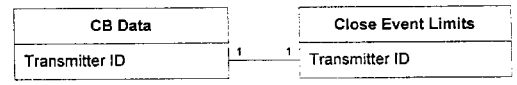

Attributes:      One-To-One (External)
Attributes:      Unique, Enforced, Inherited, Cascade Updates, Cascade Deletes

[C:\CSTAT\CBDATA.MDB].Reference1

Attributes:      One-To-One (External)
Attributes:      Unique, Enforced, Inherited, Cascade Updates, Cascade Deletes

[C:\CSTAT\CBDATA.MDB].Reference10

Attributes:      One-To-Many (External)
Attributes:      Enforced, Inherited, Cascade Updates, Cascade Deletes Table: CB Data  
Thursday, June 20, 1996  
Page: 9

[C:\CSTAT\CBDATA.MDB].Reference11

Attributes: Enforced, Inherited, Cascade Updates, Cascade Deletes
Attributes: One-To-Many (External)

[C:\CSTAT\CBDATA.MDB].Reference12

Attributes: One-To-Many (External)
Attributes: Enforced, Inherited, Cascade Updates, Cascade Deletes

[C:\CSTAT\CBDATA.MDB].Reference2

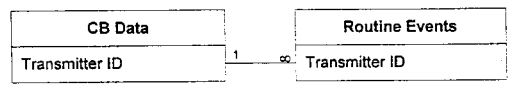

Attributes: One-To-Many (External)
Attributes: Enforced, Inherited, Cascade Updates, Cascade Deletes

[C:\CSTAT\CBDATA.MDB].Reference3

Attributes: One-To-Many (External)
Attributes: Enforced, Inherited, Cascade Updates, Cascade Deletes

[C:\CSTAT\CBDATA.MDB].Reference4

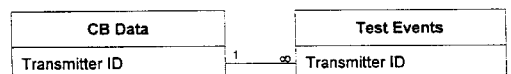

Attributes: Enforced, Inherited, Cascade Updates, Cascade Deletes
Attributes: One-To-Many (External)

Table: CB Data

Thursday, June 20, 1996
Page: 10

[C:\CSTAT\CBDATA.MDB].Reference5

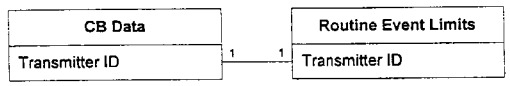

Attributes:      One-To-One (External)
Attributes:      Unique, Enforced, Inherited, Cascade Updates, Cascade Deletes

[C:\CSTAT\CBDATA.MDB].Reference6

Attributes:      One-To-Many (External)
Attributes:      Enforced, Inherited, Cascade Updates, Cascade Deletes

[C:\CSTAT\CBDATA.MDB].Reference7

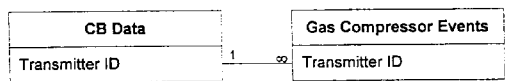

Attributes:      One-To-Many (External)
Attributes:      Enforced, Inherited, Cascade Updates, Cascade Deletes

[C:\CSTAT\CBDATA.MDB].Reference8

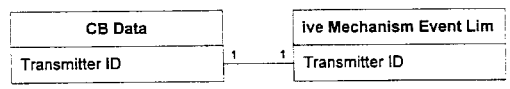

Attributes:      One-To-One (External)
Attributes:      Unique, Enforced, Inherited, Cascade Updates, Cascade Deletes

[C:\CSTAT\CBDATA.MDB].Reference9

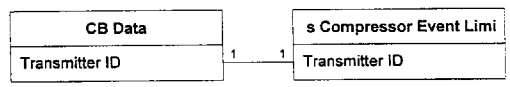

Attributes:      Unique, Enforced, Inherited, Cascade Updates, Cascade Deletes
Attributes:      One-To-One (External)

| | Thursday, June 20, 1996 |
|---|---:|
| Table: CB Data | Page: 11 |

CB DataBreaker Manufacturers

Attributes: Indeterminate
Attributes: Not Enforced

CB DataBreaker Manufacturers1

Attributes: Indeterminate
Attributes: Not Enforced

CB DataBreaker Type

Attributes: Not Enforced
Attributes: Indeterminate

Table Indexes

| Name | Number of Fields |
|---|---|
| Branch | 1 |
| Fields: | Branch, Ascending |
| Breaker Duty Life | 1 |
| Fields: | Breaker Duty Life, Ascending |
| Breaker Duty Load | 1 |
| Fields: | Breaker Duty Load, Ascending |
| Breaker Tag | 1 |
| Fields: | Breaker Tag, Ascending |
| Condition | 1 |
| Fields: | Alarm Condition, Ascending |
| District | 1 |
| Fields: | District, Ascending |
| Gas Comp Type | 1 |
| Fields: | Gas Compressor Type, Ascending |
| Group | 1 |
| Fields: | Group, Ascending |

| Table: CB Data | | Thursday, June 20, 1996 |
|---|---|---|
| Installed | 1 | |
| Fields: | Installed, Ascending | |
| Last Event | 1 | |
| Fields: | Last Event, Ascending | |
| Last Service | 1 | |
| Fields: | Last Service, Ascending | |
| Location | 1 | |
| Fields: | Location, Ascending | |
| Model | 1 | |
| Fields: | Model, Ascending | |
| PrimaryKey | 1 | |
| Fields: | Transmitter ID, Ascending | |
| Priority | 1 | |
| Fields: | Priority, Ascending | |
| Type | 1 | |
| Fields: | Type, Ascending | |
| Vendor | 1 | |
| Fields: | Vendor, Ascending | |

| Table: CB Filter | Thursday, June 20, 1996 |
| --- | --- |
| | Page: 13 |

Properties

| | | | |
| --- | --- | --- | --- |
| Date Created: | 11/22/95 9:23:41 AM | Def. Updatable: | True |
| Last Updated: | 6/13/96 8:24:30 AM | Order By On: | False |
| Record Count: | 1 | | |

Columns

| Name | Type | Size |
| --- | --- | --- |
| Breaker Tag | Text | 12 |
| District | Text | 20 |
| Branch | Text | 20 |
| Group | Text | 6 |
| Location | Text | 20 |
| Last Service | Date/Time | 8 |
| Breaker Duty Life | Number (Double) | 8 |
| Breaker Duty Load | Number (Double) | 8 |
| Drive Duty Cycle | Number (Double) | 8 |
| Drive Charge Rate | Number (Double) | 8 |
| Gas Comp Duty Cycle | Number (Double) | 8 |
| Gas Comp Charge Rate | Number (Double) | 8 |
| Priority | Number (Byte) | 1 |
| Problem | Number (Integer) | 2 |
| Sort Option | Number (Byte) | 1 |
| Sort Order | Number (Byte) | 1 |
| Type | Number (Integer) | 2 |

| | Thursday, June 20, 1996 |
|---|---|
| Table: Close Event Limits | Page: 14 |

Properties

| | | | |
|---|---|---|---|
| Attributes: | Linked | Connect String: | ;DATABASE=C:\CSTAT\CBDATA.MDB |
| Date Created: | 6/10/96 1:25:15 PM | Def. Updatable: | False |
| Description: | Alarm limit settings for close events | Last Updated: | 6/10/96 1:25:15 PM |
| Order By On: | False | Record Count: | Not Available |
| Src Table Name: | Close Event Limits | | |

Columns

| Name | Type | Size |
|---|---|---|
| Transmitter ID | Text | 6 |
| Event Type | Number (Byte) | 1 |
| Total Event Time Limit | Number (Double) | 8 |
| Total Event Time Average | Number (Double) | 8 |
| Total Event Time Compensated | Number (Double) | 8 |
| Total Event Time Tolerance | Number (Double) | 8 |
| Total Event Option | Yes/No | 1 |
| Phase A Event Time Limit | Number (Double) | 8 |
| Phase A Event Time Average | Number (Double) | 8 |
| Phase A Event Time Tolerance | Number (Double) | 8 |
| Phase B Event Time Limit | Number (Double) | 8 |
| Phase B Event Time Average | Number (Double) | 8 |
| Phase B Event Time Tolerance | Number (Double) | 8 |
| Phase C Event Time Limit | Number (Double) | 8 |
| Phase C Event Time Average | Number (Double) | 8 |
| Phase C Event Time Tolerance | Number (Double) | 8 |
| Limits Changed | Yes/No | 1 |

Relationships

[C:\CSTAT\CBDATA.MDB].Reference

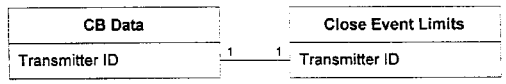

| CB Data | | Close Event Limits |
|---|---|---|
| Transmitter ID | 1——1 | Transmitter ID |

Attributes: Unique, Enforced, Inherited, Cascade Updates, Cascade Deletes
Attributes: One-To-One (External)

Table Indexes

| Name | Number of Fields |
|---|---|
| PrimaryKey | 1 |
| Fields: | Transmitter ID, Ascending |

| Table: Close Event Limits | | Thursday, June 20, 1996 |
|---|---|---|
| Reference | 1 | |
| Fields: | Transmitter ID, Ascending | |

Table: Communications Data

Thursday, June 20, 1996
Page: 16

Properties

| | | | |
|---|---|---|---|
| Attributes: | Linked | Connect String: | ;DATABASE=C:\CSTAT\CBDATA.MDB |
| Date Created: | 6/10/96 1:25:15 PM | Def. Updatable: | False |
| Description: | Data for communications to transmitters | Last Updated: | 6/10/96 1:25:15 PM |
| Order By On: | False | Record Count: | Not Available |
| Src Table Name: | Communications Data | | |

Columns

| Name | Type | Size |
|---|---|---|
| Transmitter ID | Text | 6 |
| Comm Failure | Yes/No | 1 |
| In Service | Yes/No | 1 |
| Event Date | Date/Time | 8 |
| Network Address | Number (Long) | 4 |

Relationships

[C:\CSTAT\CBDATA.MDB].CB DataCommunications Data

Attributes: Unique, Enforced, Inherited, Cascade Updates, Cascade Deletes
Attributes: One-To-One (External)

Table Indexes

| Name | Number of Fields |
|---|---|
| CB DataCommunications Data | 1 |
| Fields: | Transmitter ID, Ascending |
| Event Date | 1 |
| Fields: | Event Date, Ascending |
| Network Address | 1 |
| Fields: | Network Address, Ascending |
| PrimaryKey | 1 |
| Fields: | Transmitter ID, Ascending |

Thursday, June 20, 1996
Page: 17

Table: Drive Mechanism Event Limits

Properties

| | | | |
|---|---|---|---|
| Attributes: | Linked | Connect String: | ;DATABASE=C:\CSTAT\CBDATA.MDB |
| Date Created: | 6/10/96 1:25:15 PM | Def. Updatable: | False |
| Description: | Alarm limit settings for Drive Mechanism Events | Last Updated: | 6/10/96 1:25:16 PM |
| Order By On: | False | Record Count: | Not Available |
| Src Table Name: | Drive Mechanism Event Limits | | |

Columns

| Name | Type | Size |
|---|---|---|
| Transmitter ID | Text | 6 |
| Event Type | Number (Byte) | 1 |
| Mechanism Duty Cycle Baseline | Number (Double) | 8 |
| Mechanism Duty Cycle Tolerance | Number (Double) | 8 |
| Mechanism Duty Cycle Limit | Number (Double) | 8 |
| Corrected Mechanism Charge Time Baseline | Number (Double) | 8 |
| Corrected Mechanism Charge Time Tolerance | Number (Double) | 8 |
| Corrected Mechanism Charge Time Limit | Number (Double) | 8 |
| Limits Changed | Yes/No | 1 |
| Has Baseline | Yes/No | 1 |

Relationships

[C:\CSTAT\CBDATA.MDB].Reference8

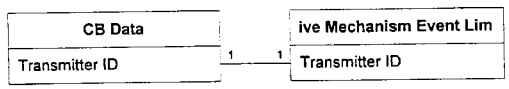

Attributes: Unique, Enforced, Inherited, Cascade Updates, Cascade Deletes
Attributes: One-To-One (External)

Table Indexes

| Name | Number of Fields |
|---|---|
| Has Baseline | 1 |
| Fields: | Has Baseline, Ascending |
| PrimaryKey | 1 |
| Fields: | Transmitter ID, Ascending |
| Reference8 | 1 |
| Fields: | Transmitter ID, Ascending |

Thursday, June 20, 1996

Table: Drive Mechanism Events

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Drive Mechaism event data | Last Updated: | 6/10/96 1:25:16 PM |
| Order By On: | False | Record Count: | Not Available |
| Src Table Name: | Drive Mechanism Events | | |

Columns

| Name | Type | Size |
|---|---|---|
| Transmitter ID | Text | 6 |
| Event Date | Date/Time | 8 |
| Event Type | Number (Byte) | 1 |
| Ambient Air Temperature | Number (Double) | 8 |
| Housing Air Temperature | Number (Double) | 8 |
| Start Receiver Pressure | Number (Double) | 8 |
| Stop Receiver Pressure | Number (Double) | 8 |
| Mechanism Charge Time | Number (Double) | 8 |
| Corrected Mechanism Charge Time | Number (Double) | 8 |
| Mechanism Duty Cycle | Number (Double) | 8 |
| Events Since Last Test | Number (Integer) | 2 |
| Historical Data | Yes/No | 1 |

Relationships

[C:\CSTAT\CBDATA.MDB].Reference6

Attributes: Enforced, Inherited, Cascade Updates, Cascade Deletes
Attributes: One-To-Many (External)

Table Indexes

| Name | Number of Fields |
|---|---|
| Back Event Date | 1 |
| Fields: | Event Date, Descending |
| Event Date | 1 |
| Fields: | Event Date, Ascending |
| Historical Data | 1 |
| Fields: | Historical Data, Ascending |
| PrimaryKey | 2 |

| | Thursday, June 20, 1996 |
|---|---:|
| Table: Drive Mechanism Events | Page: 19 |
| Fields: | Transmitter ID, Ascending |
| | Event Date, Ascending |
| Reference6 | 1 |
| Fields: | Transmitter ID, Ascending |

| | Thursday, June 20, 1996 |
|---|---|
| Table: Event Types | Page: 20 |

Properties
| | | | |
|---|---|---|---|
| Date Created: | 11/29/95 1:41:11 PM | Def. Updatable: | True |
| Last Updated: | 4/30/96 8:24:25 AM | Order By On: | False |
| Record Count: | 10 | | |

Columns

| Name | Type | Size |
|---|---|---|
| Event Type | Number (Byte) | 1 |
| Event Name | Text | 15 |

Table Indexes

| Name | Number of Fields |
|---|---|
| Event Name | 1 |
| Fields: | Event Name, Ascending |
| PrimaryKey | 1 |
| Fields: | Event Type, Ascending |

Table: Gas Compressor Event Limits

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Alarm limit setting for gas compressor events | Last Updated: | 6/10/96 1:25:16 PM |
| Order By On: | False | Record Count: | Not Available |
| Src Table Name: | Gas Compressor Event Limits | | |

Columns

| Name | Type | Size |
|---|---|---|
| Transmitter ID | Text | 6 |
| Event Type | Number (Byte) | 1 |
| GC Duty Cycle Baseline | Number (Double) | 8 |
| GC Duty Cycle Tolerance | Number (Double) | 8 |
| GC Duty Cycle Limit | Number (Double) | 8 |
| Corrected GC Charge Time Baseline | Number (Double) | 8 |
| Corrected GC Charge Time Tolerance | Number (Double) | 8 |
| Corrected GC Charge Time Limit | Number (Double) | 8 |
| Limits Changed | Yes/No | 1 |
| Has Baseline | Yes/No | 1 |

Relationships

[C:\CSTAT\CBDATA.MDB].Reference9

| CB Data | | s Compressor Event Limi |
|---|---|---|
| Transmitter ID | 1 —— 1 | Transmitter ID |

Attributes: Unique, Enforced, Inherited, Cascade Updates, Cascade Deletes
Attributes: One-To-One (External)

Table Indexes

| Name | Number of Fields |
|---|---|
| Has Baseline | 1 |
| Fields: | Has Baseline, Ascending |
| PrimaryKey | 1 |
| Fields: | Transmitter ID, Ascending |
| Reference9 | 1 |
| Fields: | Transmitter ID, Ascending |

Table: Gas Compressor Events

Thursday, June 20, 1996
Page: 22

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Gas Compresor event data | Last Updated: | 6/10/96 1:25:16 PM |
| Order By On: | False | Record Count: | Not Available |
| Src Table Name: | Gas Compressor Events | | |

Columns

| Name | Type | Size |
|---|---|---|
| Transmitter ID | Text | 6 |
| Event Date | Date/Time | 8 |
| Event Type | Number (Byte) | 1 |
| Ambient Air Temperature | Number (Double) | 8 |
| Gas Temperature | Number (Double) | 8 |
| Start Discharge Pressure | Number (Double) | 8 |
| Stop Discharge Pressure | Number (Double) | 8 |
| Vessel Pressure | Number (Double) | 8 |
| GC Charge Time | Number (Double) | 8 |
| Corrected GC Charge Time | Number (Double) | 8 |
| GC Duty Cycle | Number (Double) | 8 |
| Events Since Last Test | Number (Integer) | 2 |
| Historical Data | Yes/No | 1 |

Relationships

[C:\CSTAT\CBDATA.MDB].Reference7

| Attributes: | Enforced, Inherited, Cascade Updates, Cascade Deletes |
|---|---|
| Attributes: | One-To-Many (External) |

Table Indexes

| Name | Number of Fields |
|---|---|
| Back Event Date | 1 |
| Fields: | Event Date, Descending |
| Event Date | 1 |
| Fields: | Event Date, Ascending |
| Historical Data | 1 |
| Fields: | Historical Data, Ascending |

| Table: Gas Compressor Events | | Thursday, June 20, 1996 Page: 23 |
|---|---|---|
| PrimaryKey | 2 | |
| Fields: | Transmitter ID, Ascending | |
| | Event Date, Ascending | |
| Reference7 | 1 | |
| Fields: | Transmitter ID, Ascending | |

Table: Maintenance Activity

Thursday, June 20, 1996

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Record of breaker rebuild and repair operations | Last Updated: | 6/10/96 1:25:16 PM |
| Order By On: | False | Record Count: | Not Available |
| Src Table Name: | Maintenance Activity | | |

Columns

| Name | Type | Size |
|---|---|---|
| Rebuild ID | Number (Long) | 4 |
| Transmitter ID | Text | 6 |
| Rebuild Date | Date/Time | 8 |
| Serviced | Number (Integer) | 2 |
| Name | Text | 25 |
| Total Labor | Number (Single) | 4 |
| Work Order | Text | 20 |
| Repair Only | Yes/No | 1 |

Relationships

[C:\CSTAT\CBDATA.MDB].CB DataMaintenance Activity

| CB Data | | Maintenance Activity |
|---|---|---|
| Transmitter ID | 1 ── ∞ | Transmitter ID |

Attributes: Enforced, Inherited, Cascade Updates
Attributes: One-To-Many (External)

Table Indexes

| Name | Number of Fields |
|---|---|
| CB DataMaintenance Activity | 1 |
| Fields: | Transmitter ID, Ascending |
| PrimaryKey | 1 |
| Fields: | Rebuild ID, Ascending |
| Rebuild Date | 1 |
| Fields: | Rebuild Date, Ascending |
| Rebuild ID | 1 |
| Fields: | Rebuild ID, Ascending |
| Transmitter ID | 1 |
| Fields: | Transmitter ID, Ascending |

| | | Thursday, June 20, 1996 |
|---|---|---|
| Table: Maintenance Activity | | Page: 25 |
| Work Order | 1 | |
| Fields: | Work Order, Ascending | |

| | Thursday, June 20, 1996 |
|---|---|
| Table: Messages | |

Properties
| | | | |
|---|---|---|---|
| Date Created: | 11/22/95 9:23:44 AM | Def. Updatable: | True |
| Last Updated: | 6/13/96 8:28:28 AM | Order By On: | False |
| Record Count: | 36 | | |

Columns
| Name | Type | Size |
|---|---|---|
| ICode | Number (Integer) | 2 |
| Message | Text | 255 |

Table Indexes
| Name | Number of Fields |
|---|---|
| PrimaryKey | 1 |
| Fields: | ICode, Ascending |

Table: Plot Options

Thursday, June 20, 1996
Page: 27

Properties

| | | | |
|---|---|---|---|
| Date Created: | 1/3/96 1:22:26 PM | Def. Updatable: | True |
| Frozen Columns: | 4 | Last Updated: | 3/18/96 1:10:37 PM |
| Order By On: | False | Record Count: | 61 |

Columns

| Name | Type | Size |
|---|---|---|
| Data Source | Number (Byte) | 1 |
| Plot Type | Number (Byte) | 1 |
| Selection | Text | 50 |
| Y-Axis Variable | Text | 50 |
| X-Axis Variable | Text | 50 |
| Y-Axis Label - Eng | Text | 10 |
| Y-Axis Label - SI | Text | 10 |
| Data Table | Text | 50 |
| Alarm Limit Table | Text | 50 |
| Alarm Limit Field | Text | 50 |
| Cycles Option | Yes/No | 1 |
| Special Type | Number (Integer) | 2 |

Table Indexes

| Name | Number of Fields |
|---|---|
| Alarm Limit Field | 1 |
| Fields: | Alarm Limit Field, Ascending |
| Alarm Limit Table | 1 |
| Fields: | Alarm Limit Table, Ascending |
| Data Source | 1 |
| Fields: | Data Source, Ascending |
| Plot Type | 1 |
| Fields: | Plot Type, Ascending |
| PrimaryKey | 3 |
| Fields: | Data Source, Ascending |
| | Plot Type, Ascending |
| | Selection, Ascending |
| Selection | 1 |
| Fields: | Selection, Ascending |
| Special Type | 1 |
| Fields: | Special Type, Ascending |
| X-Axis Variable | 1 |
| Fields: | X-Axis Variable, Ascending |
| Y-Axis Variable | 1 |
| Fields: | Y-Axis Variable, Ascending |

Table: Purge List

Thursday, June 20, 1996
Page: 28

Properties

| | | | |
|---|---|---|---|
| Date Created: | 1/29/96 3:54:40 PM | Def. Updatable: | True |
| Last Updated: | 6/11/96 7:35:57 AM | Order By On: | False |
| Record Count: | 5 | | |

Columns

| Name | Type | Size |
|---|---|---|
| Table Name | Text | 50 |
| Process | Number (Integer) | 2 |

Table Indexes

| Name | Number of Fields |
|---|---|
| PrimaryKey | 1 |
| Fields: | Table Name, Ascending |

Table: Report List

Thursday, June 20, 1996
Page: 29

Properties
| | | | |
|---|---|---|---|
| Date Created: | 11/27/95 8:00:57 AM | Def. Updatable: | True |
| Last Updated: | 4/19/96 12:46:56 PM | Order By On: | False |
| Record Count: | 5 | | |

Columns

| Name | Type | Size |
|---|---|---|
| Report Name | Text | 50 |
| Type | Text | 10 |
| Date Added | Date/Time | 8 |
| Subform Name | Text | 40 |

Table Indexes

| Name | Number of Fields |
|---|---|
| PrimaryKey | 1 |
| Fields: | Report Name, Ascending |
| Type | 1 |
| Fields: | Type, Ascending |

Table: Routine Event Limits

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Alarm limit settings for routine events | Last Updated: | 6/10/96 1:25:16 PM |
| Order By On: | False | Record Count: | Not Available |
| Src Table Name: | Routine Event Limits | | |

Columns

| Name | Type | Size |
|---|---|---|
| Transmitter ID | Text | 6 |
| Event Type | Number (Byte) | 1 |
| Housing Air Temperature Limit | Number (Double) | 8 |
| Receiver Pressure Limit | Number (Double) | 8 |
| Vessel Pressure Limit | Number (Double) | 8 |
| Discharge Pressure Limit | Number (Double) | 8 |
| Partial Discharge Limit | Number (Double) | 8 |
| Duty Load Limit | Number (Double) | 8 |
| Duty Life Limit | Number (Double) | 8 |
| Total Actuation Limit | Number (Integer) | 2 |
| Current Limit | Number (Double) | 8 |
| Limits Changed | Yes/No | 1 |

Relationships

[C:\CSTAT\CBDATA.MDB].Reference5

Attributes: Unique, Enforced, Inherited, Cascade Updates, Cascade Deletes
Attributes: One-To-One (External)

Table Indexes

| Name | Number of Fields |
|---|---|
| PrimaryKey | 1 |
| Fields: | Transmitter ID, Ascending |
| Reference5 | 1 |
| Fields: | Transmitter ID, Ascending |

Table: Routine Events

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Routine event data | Last Updated: | 6/10/96 1:25:16 PM |
| Order By On: | False | Record Count: | Not Available |
| Src Table Name: | Routine Events | | |

Columns

| Name | Type | Size |
|---|---|---|
| Transmitter ID | Text | 6 |
| Event Date | Date/Time | 8 |
| Event Type | Number (Byte) | 1 |
| Ambient Air Temperature | Number (Double) | 8 |
| Housing Air Temperature | Number (Double) | 8 |
| Gas Temperature | Number (Double) | 8 |
| Receiver Pressure | Number (Double) | 8 |
| Vessel Pressure | Number (Double) | 8 |
| Discharge Pressure | Number (Double) | 8 |
| Phase A Amp-Hours | Number (Double) | 8 |
| Phase B Amp-Hours | Number (Double) | 8 |
| Phase C Amp-Hours | Number (Double) | 8 |
| Partial Discharge | Number (Double) | 8 |
| Duty Load | Number (Double) | 8 |
| Breaker State | Number (Integer) | 2 |
| Historical Data | Yes/No | 1 |

Relationships

[C:\CSTAT\CBDATA.MDB].Reference2

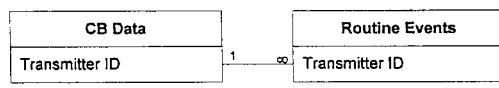

| | |
|---|---|
| Attributes: | Enforced, Inherited, Cascade Updates, Cascade Deletes |
| Attributes: | One-To-Many (External) |

Table Indexes

| Name | Number of Fields |
|---|---|
| Back Event Date | 1 |
| Fields: | Event Date, Descending |
| Event Date | 1 |

| | | Thursday, June 20, 1996 |
|---|---|---|
| Table: Routine Events | | Page: 32 |
| Fields: | Event Date, Ascending | |
| Historical Data | 1 | |
| Fields: | Historical Data, Ascending | |
| PrimaryKey | 2 | |
| Fields: | Transmitter ID, Ascending | |
| | Event Date, Ascending | |
| Reference2 | 1 | |
| Fields: | Transmitter ID, Ascending | |

Table: Sort Options

Thursday, June 20, 1996
Page: 33

Properties
Date Created:   3/18/96 2:15:22 PM        Def. Updatable:   True
Last Updated:   4/21/96 3:16:43 PM        Order By On:      False
Record Count:   18

Columns

| Name | Type | Size |
|---|---|---|
| Sort Code | Number (Byte) | 1 |
| Option Text | Text | 25 |

Table Indexes

| Name | Number of Fields |
|---|---|
| PrimaryKey | 1 |
| Fields: | Sort Code, Ascending |
| Sort Code | 1 |
| Fields: | Sort Code, Ascending |

Table: System Data

Thursday, June 20, 1996
Page: 34

Properties

| | | | |
|---|---|---|---|
| Date Created: | 11/24/95 12:29:20 AM | Def. Updatable: | True |
| Last Updated: | 6/11/96 2:14:45 PM | Order By On: | False |
| Record Count: | 1 | | |

Columns

| Name | Type | Size |
|---|---|---|
| User Name | Text | 30 |
| Main Screen Update | Number (Integer) | 2 |
| Version | Text | 7 |
| Serial | Number (Long) | 4 |
| Install Date | Date/Time | 8 |
| Registered User | Text | 35 |
| Facility | Text | 30 |
| Workstation Type | Number (Byte) | 1 |
| Units Option | Number (Byte) | 1 |
| Note File Directory | Text | 64 |
| Application Directory | Text | 64 |
| Don't Show About | Yes/No | 1 |
| Cycle Time | Number (Integer) | 2 |
| O&M Manual Directory | Text | 64 |

Table: Test Close Data Set

Thursday, June 20, 1996
Page: 35

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Piston displacement data sets for test close events | Last Updated: | 6/10/96 1:25:16 PM |
| Order By On: | False | Record Count: | Not Available |
| Src Table Name: | Test Close Data Set | | |

Columns

| Name | Type | Size |
|---|---|---|
| Transmitter ID | Text | 6 |
| Test Sequence ID | Number (Byte) | 1 |
| Time | Number (Integer) | 2 |
| Piston Displacement | Number (Double) | 8 |
| Historical Data | Yes/No | 1 |
| Event Type | Number (Byte) | 1 |

Relationships

[C:\CSTAT\CBDATA.MDB].Reference11

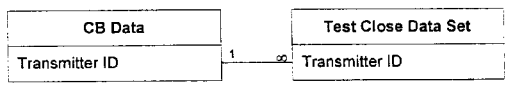

Attributes:     Enforced, Inherited, Cascade Updates, Cascade Deletes
Attributes:     One-To-Many (External)

[C:\CSTAT\CBDATA.MDB].Test EventsTest Close Data Set

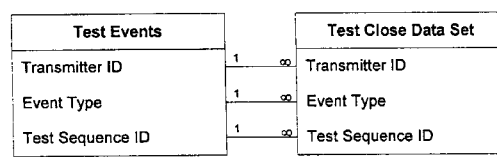

Attributes:     Enforced, Inherited, Cascade Deletes
Attributes:     One-To-Many (External)

Table Indexes

| Name | Number of Fields |
|---|---|

Table: Test Close Data Set

| | |
|---|---|
| Event Type | 1 |
| Fields: | Event Type, Ascending |
| PrimaryKey | 3 |
| Fields: | Transmitter ID, Ascending |
| | Test Sequence ID, Ascending |
| | Time, Ascending |
| Reference11 | 1 |
| Fields: | Transmitter ID, Ascending |
| Test EventsTest Close Data Set | 3 |
| Fields: | Transmitter ID, Ascending |
| | Event Type, Ascending |
| | Test Sequence ID, Ascending |
| Test Sequence ID | 1 |
| Fields: | Test Sequence ID, Ascending |
| Time | 1 |
| Fields: | Time, Ascending |

Table: Test Events                          Thursday, June 20, 1996
                                                          Page: 37

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Trip and Close test event data | Last Updated: | 6/10/96 1:25:16 PM |
| Order By On: | False | Record Count: | Not Available |
| Src Table Name: | Test Events | | |

Columns

| Name | Type | Size |
|---|---|---|
| Transmitter ID | Text | 6 |
| Event Type | Number (Byte) | 1 |
| Test Sequence ID | Number (Byte) | 1 |
| Event Date | Date/Time | 8 |
| Ambient Air Temperature | Number (Double) | 8 |
| Housing Air Temperature | Number (Double) | 8 |
| Gas Temperature | Number (Double) | 8 |
| Receiver Pressure | Number (Double) | 8 |
| Vessel Pressure | Number (Double) | 8 |
| Discharge Pressure | Number (Double) | 8 |
| Total Event Time | Number (Double) | 8 |
| Phase A Event Time | Number (Double) | 8 |
| Phase B Event Time | Number (Double) | 8 |
| Phase C Event Time | Number (Double) | 8 |
| Data Source | Text | 1 |

Relationships

[C:\CSTAT\CBDATA.MDB].Reference4

| Attributes: | Enforced, Inherited, Cascade Updates, Cascade Deletes |
|---|---|
| Attributes: | One-To-Many (External) |

Table: Test Events

[C:\CSTAT\CBDATA.MDB].Test EventsTest Close Data Set

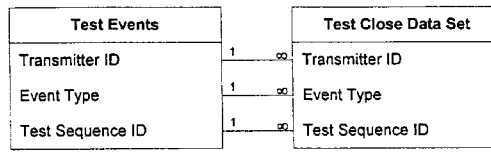

Attributes:      Enforced, Inherited, Cascade Deletes
Attributes:      One-To-Many (External)

[C:\CSTAT\CBDATA.MDB].Test EventsTest Trip Data Set

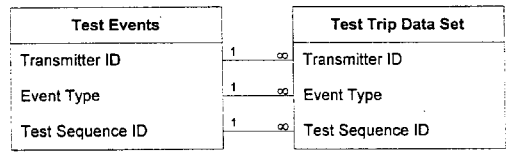

Attributes:      Enforced, Inherited, Cascade Deletes
Attributes:      One-To-Many (External)

Table Indexes

| Name | Number of Fields |
|---|---|
| Event Date | 1 |
| Fields: | Event Date, Ascending |
| Event Type | 1 |
| Fields: | Event Type, Ascending |
| PrimaryKey | 3 |
| Fields: | Transmitter ID, Ascending |
| | Event Type, Ascending |
| | Test Sequence ID, Ascending |
| Reference4 | 1 |
| Fields: | Transmitter ID, Ascending |
| Test Sequence ID | 1 |
| Fields: | Test Sequence ID, Ascending |

Table: Test Trip Data Set

Thursday, June 20, 1996

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Piston displacement data sets for test trip events | Last Updated: | 6/10/96 1:25:16 PM |
| Order By On: | False | Record Count: | Not Available |
| Src Table Name: | Test Trip Data Set | | |

Columns

| Name | Type | Size |
|---|---|---|
| Transmitter ID | Text | 6 |
| Test Sequence ID | Number (Byte) | 1 |
| Time | Number (Integer) | 2 |
| Piston Displacement | Number (Double) | 8 |
| Historical Data | Yes/No | 1 |
| Event Type | Number (Byte) | 1 |

Relationships

[C:\CSTAT\CBDATA.MDB].Reference10

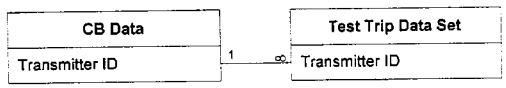

| Attributes: | Enforced, Inherited, Cascade Updates, Cascade Deletes |
|---|---|
| Attributes: | One-To-Many (External) |

[C:\CSTAT\CBDATA.MDB].Test EventsTest Trip Data Set

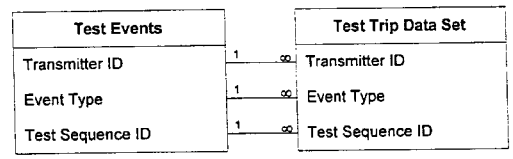

| Attributes: | Enforced, Inherited, Cascade Deletes |
|---|---|
| Attributes: | One-To-Many (External) |

Table Indexes

| Name | Number of Fields |
|---|---|

| | | Thursday, June 20, 1996 |
|---|---|---|
| Table: Test Trip Data Set | | |
| Event Type | 1 | |
| Fields: | Event Type, Ascending | |
| PrimaryKey | 3 | |
| Fields: | Transmitter ID, Ascending | |
| | Test Sequence ID, Ascending | |
| | Time, Ascending | |
| Reference10 | 1 | |
| Fields: | Transmitter ID, Ascending | |
| Test EventsTest Trip Data Set | 3 | |
| Fields: | Transmitter ID, Ascending | |
| | Event Type, Ascending | |
| | Test Sequence ID, Ascending | |
| Tesyt Sequence ID | 1 | |
| Fields: | Test Sequence ID, Ascending | |
| Time | 1 | |
| Fields: | Time, Ascending | |

Table: Trip Event Limits

Thursday, June 20, 1996
Page: 41

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Alarm limit settings for trip events | Last Updated: | 6/10/96 1:25:16 PM |
| Order By On: | False | Record Count: | Not Available |
| Src Table Name: | Trip Event Limits | | |

Columns

| Name | Type | Size |
|---|---|---|
| Transmitter ID | Text | 6 |
| Event Type | Number (Byte) | 1 |
| Total Event Time Limit | Number (Double) | 8 |
| Total Event Time Average | Number (Double) | 8 |
| Total Event Time Compensated | Number (Double) | 8 |
| Total Event Time Tolerance | Number (Double) | 8 |
| Total Event Option | Yes/No | 1 |
| Phase A Event Time Limit | Number (Double) | 8 |
| Phase A Event Time Average | Number (Double) | 8 |
| Phase A Event Time Tolerance | Number (Double) | 8 |
| Phase B Event Time Limit | Number (Double) | 8 |
| Phase B Event Time Average | Number (Double) | 8 |
| Phase B Event Time Tolerance | Number (Double) | 8 |
| Phase C Event Time Limit | Number (Double) | 8 |
| Phase C Event Time Average | Number (Double) | 8 |
| Phase C Event Time Tolerance | Number (Double) | 8 |
| Fault Trip Limit | Number (Integer) | 2 |
| Limits Changed | Yes/No | 1 |

Relationships

[C:\CSTAT\CBDATA.MDB].Reference1

| CB Data | Trip Event Limits |
|---|---|
| Transmitter ID | Transmitter ID |

1 — 1

Attributes: Unique, Enforced, Inherited, Cascade Updates, Cascade Deletes
Attributes: One-To-One (External)

Table Indexes

| Name | Number of Fields |
|---|---|
| PrimaryKey | 1 |
| Fields: | Transmitter ID, Ascending |

| | Thursday, June 20, 1996 |
|---|---:|
| Table: Trip Event Limits | Page: 42 |
| Reference1　　　　　　　　1 | |
| Fields:　　　　　　　　Transmitter ID, Ascending | |

Table: Trip/Close Events

Thursday, June 20, 1996
Page: 43

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Trip and Close event data | Last Updated: | 6/10/96 1:25:16 PM |
| Order By On: | True | Order By: | [Trip/Close Events].[Transmitter ID] |
| Record Count: | Not Available | Src Table Name: | Trip/Close Events |

Columns

| Name | Type | Size |
|---|---|---|
| Transmitter ID | Text | 6 |
| Event Date | Date/Time | 8 |
| Event Type | Number (Byte) | 1 |
| Ambient Air Temperature | Number (Double) | 8 |
| Housing Air Temperature | Number (Double) | 8 |
| Receiver Pressure | Number (Double) | 8 |
| Vessel Pressure | Number (Double) | 8 |
| Discharge Pressure | Number (Double) | 8 |
| Phase A Current | Number (Double) | 8 |
| Phase B Current | Number (Double) | 8 |
| Phase C Current | Number (Double) | 8 |
| Total Event Time | Number (Double) | 8 |
| Phase A Event Time | Number (Double) | 8 |
| Phase B Event Time | Number (Double) | 8 |
| Phase C Event Time | Number (Double) | 8 |
| Calculated Total Event Time | Number (Double) | 8 |
| Events Since Last Test | Number (Integer) | 2 |
| Fault Trip | Yes/No | 1 |
| Duty Life | Number (Double) | 8 |
| Historical Data | Yes/No | 1 |

Relationships

[C:\CSTAT\CBDATA.MDB].Reference3

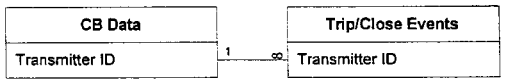

Attributes: Enforced, Inherited, Cascade Updates, Cascade Deletes
Attributes: One-To-Many (External)

Table Indexes

Table: Trip/Close Events

| Name | Number of Fields |
|---|---|
| Back Event Date | 1 |
| Fields: | Event Date, Descending |
| Event Date | 1 |
| Fields: | Event Date, Ascending |
| Event Type | 1 |
| Fields: | Event Type, Ascending |
| Historical Data | 1 |
| Fields: | Historical Data, Ascending |
| PrimaryKey | 3 |
| Fields: | Transmitter ID, Ascending |
|  | Event Date, Ascending |
|  | Event Type, Ascending |
| Reference3 | 1 |
| Fields: | Transmitter ID, Ascending |

Table: Update Errors

Thursday, June 20, 1996

Properties

| | | | |
|---|---|---|---|
| Attributes: | Linked | Connect String: | ;DATABASE=C:\CSTAT\CBDATA.MDB |
| Date Created: | 6/10/96 1:25:16 PM | Def. Updatable: | False |
| Description: | Errors that occur in external programs (OLE servers) | Last Updated: | 6/10/96 1:25:16 PM |
| Order By On: | False | Record Count: | Not Available |
| Src Table Name: | Update Errors | | |

Columns

| Name | Type | Size |
|---|---|---|
| Error Time | Date/Time | 8 |
| Error Code | Number (Integer) | 2 |
| Error Message | Text | 255 |
| Module Name | Text | 50 |
| Transmitter ID | Text | 6 |
| User | Text | 15 |

Table Indexes

| Name | Number of Fields |
|---|---|
| Error Code | 1 |
| Fields: | Error Code, Ascending |
| Transmitter ID | 1 |
| Fields: | Transmitter ID, Ascending |
| User | 1 |
| Fields: | User, Ascending |

I claim:

1. A switchyard equipment monitoring system, the switchyard equipment receiving power and control signals from a remote location via a power line, the system comprising:
   (a) plurality of monitoring devices, each monitoring device connected to a piece of switchyard equipment, each monitoring device including,
      (i) testing and/or monitoring circuitry for testing and/or monitoring one or more conditions of the piece of switchyard equipment and generating condition data therefrom, wherein said circuitry accepts a plurality of analog and digital input signals from the switchyard equipment, at least one of the analog input signals being a response signal to an excitation or test signal sent from the monitoring device to the monitored piece of switchyard equipment,
      (ii) a storage device for storing the condition data, and
      (iii) a transmitter adapted to transmit the condition data to the remote location via the power line;
   (b) a communications node at the remote location, the node being connected to the power line; and
   (c) a remote host computer connected to the communications node for receiving the condition data transmitted to the remote location and storing the received condition data therein.

2. A switchyard equipment monitoring system, the switchyard equipment including circuit breakers and receiving power and control signals from a remote location via a power line, the system comprising:
   (a) a plurality of monitoring devices, each monitoring device connected to a piece of switchyard equipment, each monitoring device including,
      (i) testing and/or monitoring circuitry for testing and/or monitoring one or more conditions of the piece of switchyard equipment and generating condition data therefrom,
      (ii) a storage device for storing the condition data, and
      (iii) a transmitter adapted to transmit the condition data to the remote location via the power line;
   (b) a communications node at the remote location, the node being connected to the power line; and
   (c) a remote host computer connected to the communications node for receiving the condition data transmitted to the remote location and storing the received condition data therein, said remote host computer including,
      (i) a database for storing data received from the plurality of monitoring devices, said data including one or more of the following for each circuit breaker;
         time of fault initiation, if a fault occurs;
         current on each phase when the circuit breaker is operated;
         time of trip/close coil energization;
         time of arc extinction;
         ambient temperature in mechanism cabinet;
         accumulator air pressure; and
         gas pressure on compressors; and
      (ii) a data analyzer for analyzing the data in the database to determine equipment performance, determine remaining life span of the equipment, or develop predictive maintenance schedules for the equipment.

3. A monitoring device for switchyard equipment, wherein the switchyard equipment receives power and control signals from a remote location via a power line, the monitoring device comprising:
   (a) testing and/or monitoring circuitry for testing and/or monitoring one or more conditions of the switchyard equipment and generating condition data therefrom, wherein said circuitry accepts a plurality of analog and digital input signals, at least one of the analog input signals being a response signal to an excitation or test signal sent from the monitoring device to the monitored piece of switchyard equipment,
   (b) a storage device for storing the condition data; and
   (c) a transmitter adapted to transmit the condition data to a remotely located computer via the power line.

4. A monitoring device having a test mode for testing a piece of switchyard equipment, wherein the switchyard equipment receives power and control signals from a remote location via a power line, the monitoring device comprising:
   (a) testing and/or monitoring circuitry for testing and/or monitoring one or more conditions of the switchyard equipment and generating condition data therefrom,
   (b) a storage device for storing the condition data;
   (c) a transmitter adapted to transmit the condition data to a remotely located computer via the power line;
   (d) an interface for interfacing the monitoring device with a local computer, the local computer initiating and controlling the testing and receiving the generated test data;
   (e) an excitation voltage generator and output for producing an excitation voltage, said generator adapted for connection to line and load sides of a plural phase circuit breaker; and
   (f) a circuit adapted to receive test trip event and test close event data, including breaker mechanism movement data, upon application of the excitation voltage.

5. A single monitoring device connected to power line for testing a plural phase circuit breaker to obtain breaker response time, the power line being used by switchyard equipment for receiving power and control signals from a remote location, the monitoring device including:
   (a) an excitation voltage generator and output adapted for connection to line and load sides of the plural breaker phases;
   (b) a circuit adapted to receive test trip event and test close event data, including breaker mechanism movement data, upon application of the excitation voltage;
   (c) a transceiver for connection to the power line, the transceiver adapted to communicate via the power line with a computer at the remote location; and
   (d) means for requesting previous data related to the circuit breaker which is stored in the remote computer, the transceiver and power line being used to send the request for previous data and receive the previous data therefrom.

6. A single monitoring device according to claim 5 further comprising:
   (e) an interface for interfacing with a local computer, the local computer initiating and controlling the testing performed by the monitoring device, initiating the request for previous data made by the monitoring device, and receiving the generated test data and previous test data for analysis therein.

* * * * *

UNITED STATES PATENT AND TRADEMARK OFFICE
CERTIFICATE OF CORRECTION

Patent No   :   5,859,596

Dated       :   January 12, 1999

Inventor(s) :   McRae, David J.

It is certified that error appears in the above-identified patent and that said Letters Patent are hereby corrected as shown below:

At Column 2, line 55, delete "5C" and insert --5E--.

Column 16, line 55, if "and 5B is deleted, the inserion should be "and 5D" not "5D--.

At Column 16, line 55, delete "5C and 5D" and insert --5E-5J--.

At Column 16, line 60, delete "5D" and insert --5J--.

At Column 17, line 2, delete "5D" and insert --5J--.

Signed and Sealed this

Nineteenth Day of October, 1999

Attest:

Q. TODD DICKINSON

Attesting Officer

Acting Commissioner of Patents and Trademarks